United States Patent
Lu et al.

(10) Patent No.: US 10,275,699 B2
(45) Date of Patent: Apr. 30, 2019

(54) SMART CARD AND METHOD FOR MANUFACTURING SAME

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

(*) Notice: Subject to any disclaimer, the term of this patent is extended or adjusted under 35 U.S.C. 154(b) by 0 days.

(21) Appl. No.: 15/577,399

(22) PCT Filed: Jun. 8, 2016

(86) PCT No.: PCT/CN2016/085201
§ 371 (c)(1),
(2) Date: Nov. 28, 2017

(87) PCT Pub. No.: WO2016/197935
PCT Pub. Date: Dec. 15, 2016

(65) Prior Publication Data
US 2018/0174008 A1      Jun. 21, 2018

(30) Foreign Application Priority Data

Jun. 11, 2015   (CN) .......................... 2015 1 0317641
Jun. 11, 2015   (CN) .......................... 2015 1 0319241

(51) Int. Cl.
*G06K 19/07*   (2006.01)
*G06K 19/077*  (2006.01)

(52) U.S. Cl.
CPC ....... *G06K 19/077* (2013.01); *G06K 19/0723* (2013.01); *G06K 19/07743* (2013.01)

(58) Field of Classification Search
CPC ............. G06K 19/0723; G06K 19/077; G06K 19/07743
See application file for complete search history.

(56) References Cited

U.S. PATENT DOCUMENTS

| | | | | |
|---|---|---|---|---|
| 9,697,459 | B2* | 7/2017 | Finn | B23K 26/361 |
| 2004/0150962 | A1* | 8/2004 | Heinemann | G06K 19/077 361/737 |
| 2006/0030070 | A1* | 2/2006 | Leu | H01L 27/14618 438/106 |
| 2006/0054213 | A1* | 3/2006 | Baret | H01L 31/048 136/251 |
| 2012/0138691 | A1* | 6/2012 | Bosquet | G06K 19/077 235/492 |

(Continued)

*Primary Examiner* — Claude J Brown
(74) *Attorney, Agent, or Firm* — Hammer & Associates, P.C.

(57) ABSTRACT

A method for manufacturing a smart card includes: planting a solder ball on the secure chip solder pad of the main circuit board; according to the position of the secure chip solder pad on the main circuit board, milling out a groove on the substrate on which the main circuit board is packed, such that the solder ball on the secure chip solder pad is visible at the bottom of the groove; packing the secure chip module into the groove, and by use of the solder ball on the secure chip solder pad, mounting the secure chip module onto the main circuit board. The method is capable of improving the quality of the wiring of the main circuit board; and increasing the scalability of the smart card.

15 Claims, 11 Drawing Sheets

(56) References Cited

U.S. PATENT DOCUMENTS

| | | | |
|---|---|---|---|
| 2012/0217305 A1 | 8/2012 | Yamazaki | |
| 2013/0286611 A1* | 10/2013 | Droz | G06K 19/07728 |
| | | | 361/760 |
| 2014/0367473 A1* | 12/2014 | Ottobon | G06K 19/077 |
| | | | 235/488 |
| 2015/0049925 A1* | 2/2015 | Lowe | G06K 19/0718 |
| | | | 382/124 |
| 2015/0136858 A1* | 5/2015 | Finn | G06K 19/07754 |
| | | | 235/492 |
| 2015/0371930 A1* | 12/2015 | Merto | H01L 24/83 |
| | | | 438/123 |

* cited by examiner

SMART CARD AND METHOD FOR MANUFACTURING SAME

FIELD OF THE INVENTION

The present invention relates to a smart card and a method for making the smart card, which belongs to the field of electronic technique.

PRIOR ART

With development of the electronic technique, the smart card, relying on its vast storage for information and high security, applies to many fields, such as finance, transportation, communication, business, education, medical care, insurance and tourism and leisure. A smart card encrypts or decrypts data via a security chip inside it and operates data transaction via contactors on a surface of the card and a reading-card terminal.

In the present packing technology of the smart card, the contactors are usually welded on a main circuit board of the smart card, and each contactor connects to a security chip via a traverse on a main circuit board. Or, the contactors and the security chip are collected in a security chip module, and the security chip module is welded on the main circuit board of the smart card.

But, there are several disadvantages in prior art:

It needs to reserve a fixed pad location for each contactor because the location of each contactor is fixed, as a result, arrangement of wire on the main circuit board has many limits, and the welding procedure needs higher requirements.

And, the smart card cannot be more extensible because the contactors and the security chip are collected in one module and a rank of an electric circuit cannot be extended.

SUMMARY OF THE INVENTION

The object of the present invention is to provide a smart card and a method for making the smart card, which removes the limits on the wire arrangement on the main circuit board caused by the contactors on the surface of the smart card.

Thus, according to one aspect of the present invention, it provides a method of making a smart card, including following steps:

assembling a security chip on an integrated module board to obtain a security chip module, and multiple contactors, which are insulated from each other, are set on one layer of the integrated module board; planting solder balls on a security chip pad of the main circuit board, milling a notch on a baseplate which filled with the main circuit board according to a location of the security chip pad of the main circuit board to make the solder ball on the security chip pad visible via the bottom of the notch;

filling the security chip module into the notch, and assembling the security chip module on the main circuit board via the solder ball on the security chip pad.

Preferably, multiple internal pads are lied on the integrated module board;

assembling the security chip on the integrated module board to obtain the security chip module specifically includes:

the security chip is assembled on the integrated module board through the coordination of a pin of the security chip and the internal pad on the integrated module board to obtain the security chip module.

Preferably, that the security chip is assembled on the integrated module board through the coordination of the pin of the security chip and the internal pad on the integrated module board to obtain the security chip module specifically includes:

welding the bolder ball on the pin of the security chip and/or the internal pad of the integrated module board, aligning each pin of the security chip with a corresponding internal pad on the integrated module board through a bolder ball, as a result, the security chip is welded on the integrated module board to make a security chip module consisted of the security chip and the integrated module board, in which one security chip corresponds to one internal pad.

Preferably, assembling the security chip on the integrated module board through the coordination of the pin of the security chip and the internal pad on the integrated module board to obtain the security chip module specifically includes:

coating conducting resin on the pin of the security chip and/or the internal pad on the integrated module board, aligning each pin of the security chip with a corresponding internal pad on the integrated module board, increasing pressure on the security chip and heating it to make the conducting resin on the security chip solidify, as a result, the security chip sticks to the integrated module board to obtain a security chip module consisted of the security chip and the integrated module board, in which one pin of the security chip corresponds one internal pad respectively.

Preferably, each contactor on the integrated module board contacts to a corresponding internal pad on the integrated module board through a via-hole on the integrated module board, and one contactor corresponds one internal pad respectively.

Preferably, multiple external pads is lied on the integrated module board, and each internal pad connects to a corresponding external pad, and one internal pad corresponds to one external pad respectively;

assembling the security chip module on the main circuit board through the solder ball on the security chip pad specifically includes:

assembling the security chip module on the main circuit board through the coordination of the solder balls on the security chip pad and the external pads on the integrated module board.

Preferably, assembling the security chip module on the main circuit board through the coordination of the solder balls on the security chip pad and the external pads on the integrated module board specifically includes:

coating tin cream on every external pad of the integrated module board and/or on a section of every solder ball at the bottom of the notch, aligning each external pad on the integrated module board with the section of a corresponding solder ball which is at the bottom of the notch to welding the security chip module on the main circuit board, in which one external pad corresponds one different solder ball.

Preferably, assembling the security chip module on the main circuit board through the coordination of the solder balls on the security chip pad and the external pads on the integrated module board specifically includes:

coating conducting resin on every external pad on the integrated module board and/or on every solder ball at the bottom of the notch, aligning each external pad on the integrated module board with the second of a corresponding solder ball which is at the bottom of the notch to welding the security chip module on the main circuit board, in which one external pad corresponds one different solder ball.

Preferably, every contactor on the integrated module board connects to a corresponding external pad through the via-hole on the integrated module board, and different contactor corresponds to different external pad respectively.

Preferably, the contactors are set on the top layer of the integrated module board.

Preferably, the number of the security chip pads is same as the number of the number of the external pads, which connects to the internal pads, on the integrated module board, and each security chip pad is insulated from another security chip pad.

Preferably, milling a notch on a base plate which filled with the main circuit board according to a location of the security chip pad of the main circuit board to make the solder ball on the security chip pad visible via the bottom of the notch specifically includes:

milling the notch for the solder ball on the security chip pad on the main circuit board on the base plate which filled with the main circuit board according to a volume and a structure of the security chip module, and the bottom of the notch include a section which is obtained by milling the solder ball on the security chip pad.

Preferably, a depth of different point of the notch is different from each other;

assembling the security chip module on the main circuit board by the coordination of the solder balls on the security chip pad and the external pad on the integrated module board specifically includes:

putting a little tin cream on every external pad on the integrated module board and/or a section of every solder ball at the bottom of the notch, and welding the security chip module on the main circuit board according to the way of aligning each external pad on the integrated module board with a section of a corresponding solder ball at the bottom of the notch, in which different external pad corresponds different solder ball; or, coating anisotropic conductive adhesive (ACA) on every external pad on the integrated module board and/or the section of every solder ball at the bottom of the notch, aligning each external pad on the integrated module board with the section of the corresponding solder ball at the bottom of the notch to bond the security chip module on the main circuit board, in which one external pad corresponds one solder ball respectively.

Preferably, the depth at the central of the notch is deeper than the depth at the edge of the notch, a profile of the notch is a stair-shape, and a horizontal base area at the central of the notch is smaller than a base area of the integrated module board on the security chip module;

assembling the security chip module on the main circuit board through the coordination of the solder ball on the security chip pad and the external pad on the integrated module board specifically includes:

putting a little of tin cream on each external pad on the integrated module board and/or the section of each solder ball at the bottom of the notch, coordinating the integrated module board on the security chip module with the edge of the notch, and welding the security chip module on the main circuit board according to the way of aligning each external pad on the integrated module board with the section of the corresponding solder ball at the bottom of the notch, in which one external pad corresponds one solder ball respectively; or, coating ACA on every external pad on the integrated module board and/or on the section of every solder ball at the bottom of the notch, coordinating the integrated module board in the security chip module with the edge of the notch, and aligning each external pad on the integrated module board with the corresponding solder ball at the bottom of the notch to bond the security chip module on the main circuit board, in which one external pad corresponds one corresponding solder ball.

Preferably, the depth at the central of the notch is deeper than the depth at the edge of the notch, and the profile of the notch is the stair-shape, and the central part of the notch matches the security chip in the security chip module;

assembling the security chip module on the main circuit board through the coordination between the solder ball on the security chip pad and the external pad on the integrated module board specifically includes:

putting a little of tin cream on every external pad on the integrated module board and/or on the section of every solder ball at the bottom of the notch, coordinating the security chip in the security chip module with the central part of the notch, and welding the security chip module on the main circuit board according to the way of aligning the each external pad on the integrated module board with the section of the corresponding solder ball at the bottom of the notch, in which one external pad corresponds one corresponding solder ball; or, coating ACA on every external pad on the integrated module board and/or on the section of every solder ball at the bottom of the notch, coordinating the security chip in the security chip module with the central part of the notch, and aligning each external pad on the integrated module board with the section of the corresponding solder ball at the bottom of the notch to bond the security chip module on the main circuit board, in which one external pad corresponds one solder ball.

Preferably, the depth at the central of the notch is deeper than the depth at the edge of the notch, the profile of the notch is the stair-shape, and the central part of the notch matches the security chip in the security chip module; there are multiple concave dots at the bottom of the notch, the number of the concave dots is as same as the number of the security chip pads on the main circuit board, there is the section of the solder ball, which is on the security chip pad, at the bottom of each concave dot, a horizontal base area of each concave dot is not smaller than the area of the external pad on the integrated module board;

assembling the security chip module on the main circuit board through the coordination between the solder ball on the security chip pad and the external pad on the integrated module board specifically includes:

putting a little of tin cream on every external pad on the integrated module board and/or on the section of the solder ball at the bottom of every concave dot, coordinating the security chip in the security chip module with the central part of the notch, and welding the security chip module on the main circuit board according to the way of aligning the each external pad on the integrated module board with the section of the solder ball at the bottom of the concave dot, in which one external pad corresponds one solder ball; or, coating conducting resin on every external pad on the integrated module board and/or on the section of the solder ball at the bottom of each concave dot, coordinating the security chip in the security chip module with the central part of the notch, aligning each external pad on the integrated module board with the section of the solder ball at the bottom of each corresponding concave dot to bond the security chip module on the main circuit board, in which one external pad corresponds one corresponding solder ball.

According to the other aspect of the present invention, it provides a smart card which includes a base plate and a main circuit board which is in the base plate, solder balls are planted on a security chip pad in the main circuit board, there is a notch at the location, which corresponds to the security chip pad, in the base plate, the solder balls on the security chip pad are visible at the bottom of the notch; a security chip module is filled in the notch, the security chip module is assembled on the main circuit board through the solder balls on the security chip pad; the security chip module includes an integrated module board and a security chip which is assembled on the integrated module board, multiple contactors, which are insulated from each other, are laid on one layer of the integrated module board.

Preferably, multiple internal pads are laid on the integrated module board, the security chip is assemble on the integrated module board through the coordination of a pin of the security chip and the internal pad on the integrated module board.

Preferably, each pin of the security chip is welded with a corresponding internal pad on the integrated module board through the bolder ball which is planted by itself and/or the bolder ball planted on the internal pad on the integrated module board, in which one pin of the security chip corresponds one corresponding internal pad.

Preferably, each pin of the security chip is welded with a corresponding internal pad through the conduction resin coated on itself and/or the conducting resin coated on the internal pad on the integrated module board, in which one pin of the security chip corresponds one corresponding internal pad.

Preferably, each contactor on the integrated module board connects to the corresponding internal pad on the integrated module board through a through hole in the integrated module board, and one contactor corresponds to one corresponding internal pad.

Preferably, multiple external pads are laid on the integrated module board, each internal pad connects to the corresponding external pad, and one internal pad corresponds to one corresponding external pad; the security chip module is assembled on the main circuit board through the coordination of the bolder ball on the security chip pad and the external pad on the integrated module board.

Preferably, each external pad on the integrated module board is welded with a section of the corresponding bolder ball at the bottom of the notch through the tin cream on itself and/or tin cream on the section of each bolder ball at the bottom of the notch, in which one external pad corresponds to one corresponding bolder ball.

Preferably, each external pad on the integrated module board bonds to the section of the corresponding solder ball at the bottom of the notch through the conducting resin on itself and/or the conducting resin on the section of each solder ball at the bottom of the notch, in which one external pad corresponds one corresponding solder ball.

Preferably, each contactor on the integrated module board connects to the corresponding external pad through the through hole in the integrated module board, and one contactor corresponds one corresponding external pad.

Preferably, the contactors are set on the top layer of the integrated module board.

Preferably, the number of the security chip pads is as same as the number of the external pads, which connect to the internal pad, on the integrated module board, and each security pad is insulated from each other.

Preferably, the notch matches with the volume and the structure of the security chip module, and the bottom of the notch includes the milled section of the solder ball on the security chip pad.

Preferably, the depth of every point of the notch is same; each external pad on the integrated module board bonds to the section of the corresponding solder ball at the bottom of the notch through ACA on itself and/or ACA on the section of each bolder ball at the bottom of the notch, in which one external pad corresponding one corresponding solder ball.

Preferably, the depth at the central of the notch is deeper than the depth at the edge of the notch, the profile of the notch is a stair-shape, and the horizon base area at the central of the notch is smaller than the base area of the integrated module board in the security chip module; the integrated module board in the security chip module matches with the edge part of the notch; each external pad on the integrated module board bonds to the section of the corresponding bolder ball at the bottom of the notch through ACA on itself and/or ACA on the section of each solder ball at the bottom of the notch, in which one external pad corresponds one corresponding solder ball.

Preferably, the depth at the central of the notch is deeper than the depth at the edge of the notch, the profile of the notch is a stair-shape, and the central part of the notch matches with the security chip in the security chip module; the security chip in the security chip module coordinates the central part of the notch; each external pad on the integrated module board bonds to the section of the corresponding solder ball at the bottom of the notch through ACA on itself and/or ACA on the section of each solder ball at the bottom of the notch, in which one external pad corresponds one corresponding one solder ball.

Preferably, the depth at the central of the notch is deeper than the depth at the edge of the notch, the profile of the notch is a stair-shape, the central part of the notch matches with the security chip in the security chip module; there are multiple concave dots at the bottom of the notch, the number of the concave dots is as same as the number of security chip pads in the main circuit board, the bottom of each concave dot includes the milled section of the solder ball on the security chip pad, and the horizon base area of each concave dot is not smaller than the area of the external pad on the integrated module board; the security chip in the security chip module coordinates the central part of the notch, each external pad on the integrated module board is aligned with the section of the solder ball at the corresponding concave dot.

According to another aspect of the present invention, it provides a method for making a smart card, including following steps:

flipping and pressing the security chip in a first preset area of the main circuit board, planting solder balls on multiple pads in a second preset area of the main circuit board;

filling the main circuit board into the slot of the base plate, milling a notch on the base plate according to the location of the pad in the second preset area to make the solder ball on the pad in the second preset area visible at the bottom of the notch;

filling a contactor module into the notch, and assembling the contactor module on the main circuit module board via the solder ball on the pad in the second preset area.

Preferably, flipping and pressing the security chip in the first preset area of the main circuit board specifically includes:

welding the security chip into the first preset area of the main circuit board; or adhering the security chip into the first preset area of the main circuit board via conducting resin.

Preferably, there are multiple pads set in the first preset area of the main circuit board, the number of the pads in the first preset area is as same as the number of the pins of the security chip, and each pad in the first preset area is insulated from each other;

welding the security chip in the first preset area of the main circuit board specifically includes:

planting solder ball on the pin of the security chip and/or the pad in the first preset area, aligning each pin of the security chip with the corresponding pad in the first preset area via the solder ball to weld the security chip into the first preset area of the main circuit board, in which one pin of the security chip corresponds one corresponding pad in the first preset area.

Preferably, there are pads set in the first preset area of the main circuit board, the number of the pads in the first preset area is as same as the number of the pins of the security chip, and each pad in the first preset area is insulated from each other;

adhering the security chip into the first preset area via conducting resin specifically includes:

coating conducting resin on the pins of the security chip and/or the pads in the first preset area, aligning each pin of the security chip with a corresponding pad in the first preset area through conducting resin, and pressing and heating the security chip to solidify the conducting resin fitting on the security chip, as a result, the security chip is adhered into the first preset area of the main circuit board, in which one pin of the security chip corresponds one corresponding pad in the first preset area.

Preferably, each pad in the first preset area connects to the corresponding pad in the second preset area through a traverse on the main circuit board, and one pad in the first preset area corresponds to one corresponding pad in the second preset area, and each pad in the second preset area is insulated from each other.

Preferably, after the main circuit board is filled into the slot of the base plate, the method further includes:

coating bonding agent on a surface where the slot is in and smoothing bonding agent.

Preferably, milling the notch on the base plate according to the location of the pads in the second preset area to make the solder balls on the pads in the second preset area visible at the bottom of the notch specifically includes:

milling notch on the base plate for the solder balls on the pad in the second preset area according to the volume and the structure of the contactor module, the bottom of the notch includes milled sections of the solder ball on the pad in the second preset area.

Preferably, the contactor module includes multiple of contactors which are insulated from each other and pins which corresponds to the contactors respectively, the number of pins in the contactor module is as same as the number of pads in the second preset area;

assembling the contactor module on the main circuit board through the solder balls on the pad in the second preset area specifically includes:

planting a solder ball on the pin of the contactor module, aligning each pin of the contactor module with the solder ball on the corresponding pad in the second preset area via the solder ball, filling the contactor module into the notch to weld the contactor module on the main circuit board, in which one pin of the contactor module corresponds one corresponding pad in the second preset area.

Preferably, the contactor module includes multiple of contactors which are insulated from each other and pins corresponding every contactors respectively, the number of the pins in the contactor module is as same as the number of the pads in the second preset area;

assembling the contactor module on the main circuit board through the solder on the pad in the second preset area specifically includes:

coating conducting resin on the pins of the contactor module and/or the solder balls on the pad in the second preset area, aligning each pin of the contactor module with the solder ball on the corresponding pad in the second preset area, and filling the contactor module into the notch, in which one pin of the contactor module corresponds one corresponding pad in the second preset area; and pressing and heating the contactor module to solidify the conducting resin adhering to the contactor module.

Preferably, pressing and heating the contactor module specifically includes:

the contactor module is mounted in the notch by a surface mount system through a preset pressure and the contactor module is heated.

Preferably, the depth of every point of the notch is same, the conducting resin is ACA.

Preferably, multiple concave dots are at the bottom of the notch, the number of the concave dots is as same as the number of pads in the second preset area, the bottom of each concave dot includes the section milled from the solder ball on the pad in the second preset area, the horizon base area of every concave dot is not smaller than the area of the corresponding pin in the contactor module;

coating conducting resin on the pins of the contactor module and/or the solder balls on the pad in the second preset area, aligning the pin of the contactor with the solder ball on the pad in the second preset area, and filling the contactor module into the notch specifically includes:

coating conducting resin on each pin of the contactor module and/or the section of the solder ball at the bottom of each concave dot, aligning each pin of the contactor module with the section of the solder ball at the bottom of the corresponding concave dot to bond the contactor module on the main circuit board, in which one pin of the contactor module corresponds one concave dot.

According to another aspect of the present invention, it provides a smart card, including a base plate and a main circuit board which is filled into the base plate, a security chip is flipped and pressed in the first preset area of the main circuit board, solder balls are planted on multiple pad in the second preset area of the main circuit board, there is a notch in the base plate where corresponds to the pad in the second preset area, the solder balls on the pad in the second preset area is visible at the bottom of the notch; a contactor module is filled in the notch, and the contactor module is assembled on the main circuit board through the solder ball on the pad in the second preset area.

Preferably, the security chip is welded in the first preset area of the main circuit board; or, the security chip is adhered in the first preset area of the main circuit board through conducting resin.

Preferably, multiple pads are set in the first preset area of the main circuit board, the number of the pad in the first preset area is as same as the number of the pins of the security chip, and each pad in the first preset area is insulated from each other;

each pin of the security chip is welded with the corresponding pad in the first preset area through the solder ball planted on itself and/or the solder ball planted on the corresponding pad in the first preset area, in which one pin of the security chip corresponds one corresponding pad in the first preset area.

Preferably, multiple pads are set in the first preset area of the main circuit board, the number of the pads in the first preset area is as same as the number of the pins of the security chip, and each pad in the first preset area is insulated from each other;

each pin of the security chip is adhered to the corresponding pad in the first preset area through conducting resin coated on itself and/or conducting resin coated on the corresponding pad in the first preset area, in which one pin of the security chip corresponds one corresponding pad in the first preset area.

Preferably, each pad in the first preset area connects to the corresponding pad in the second preset area through traverse on the main circuit board, and one pad in the first preset area corresponds to one corresponding pad in the second preset area, and each pad in the second preset area is insulated from each other.

Preferably, coating bonding agent on the surface of the base plate where the notch is in.

Preferably, the notch matches with the volume and the structure of the contactor module, the bottom of the notch includes the milled section of the solder ball on the pad in the second preset area.

Preferably, the contactor module includes multiple contactors which are insulated from each other and the pin corresponding to each contactor, and the number of the pins in the contactor module is as same as the number of the pads in the second preset area; the solder ball is planted on the pin of the contactor module, each pin of the contactor module is welded to the solder ball on the corresponding pad in the second preset area through the solder ball, in which one pin of the contactor module corresponds to one corresponding pad in the second preset area.

Preferably, the depths of everywhere at the notch are same, and conducting resin is ACA.

Preferably, there are multiple concave dots at the bottom of the notch, the number of the concave dots is just the same as the number of the pads in the second preset area, the bottom of each concave dot includes the milled section of the solder ball on the pad in the second preset area, and horizon base area of each concave dot is not smaller than the area of the corresponding pin in the contactor module;

each pin of the contactor module adheres to the section of the solder ball at the bottom of the corresponding concave dot through conducting resin coated on itself and/or conducting resin coated on the section of the solder ball at the bottom of the corresponding concave dot, in which one pin of the contactor module corresponds to one corresponding concave dot.

In the present invention, the contactor module and the security chip are assembled on the main circuit board respectively, thus, electric circuit rank of the contactor module and the security chip can be expanded, in this way, the present invention makes the smart card more extensible.

In the present invention, the security chip is assembled on the integrated module board which sets multiple contactors to obtain a security chip module, and the security chip module is assembled on the main circuit board as a whole, in this way, limit for wiring on the main circuit board caused by the contactors on the surface of the smart card becomes less, thus, the quality of wiring on the main circuit board is improved.

BRIEF DESCRIPTION OF ACCOMPANYING DRAWINGS

DETAILED DESCRIPTION OF THE INVENTION

The technical solution in Embodiments of the present invention is further described more clearly and completely with the drawings of the present invention. Apparently, the Embodiments described herein are just a few Embodiments of the present invention. On the basis of the Embodiments of the invention, all other related Embodiments made by those skilled in the art without any inventive work belong to the scope of the invention.

Figure 1:
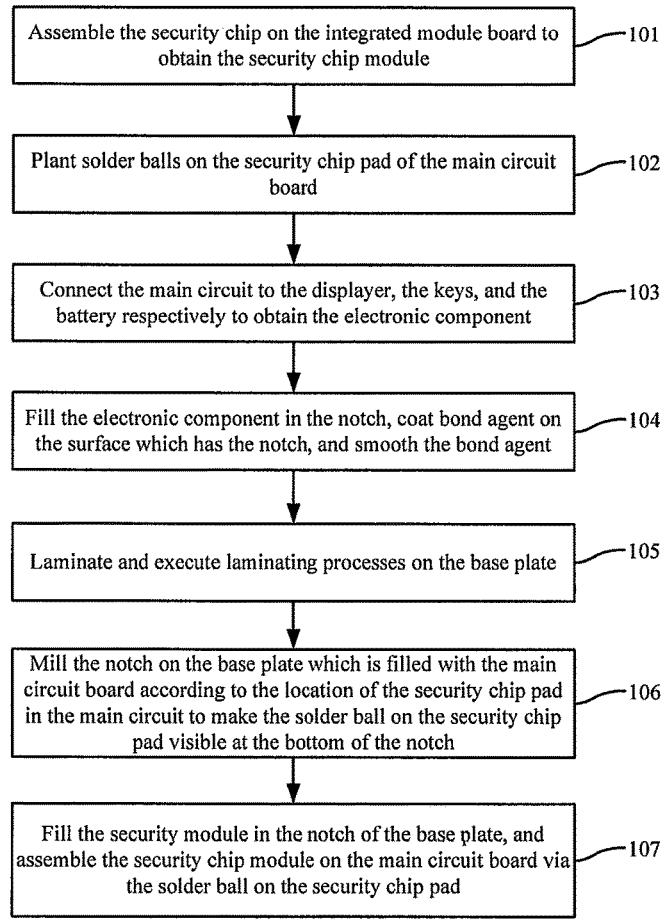
FIG. 1 shows a flow chart of a method for making a smart card according to an Embodiment of the present invention.

The Embodiment of the present invention provides a method for making a smart card, as shown in FIG. 1, including the following steps:

Step 101, a security chip is assembled on an integrated module board to obtain a security chip module.

Specifically, the security chip is assembled on the integrated module board through coordination between a pin of the security chip and an internal pad on the integrated module board to obtain the security chip module, in which multiple internal pads and multiple external pads are set on the integrated module board, and each internal pad connects to a corresponding external pad, and one internal pad corresponds one external pad.

In the present invention, the security chip can be welded on the integrated module board to obtain the security chip module; the security chip can also be adhered to the integrated module board via conducting resin to obtain the security chip module.

Figure 2:
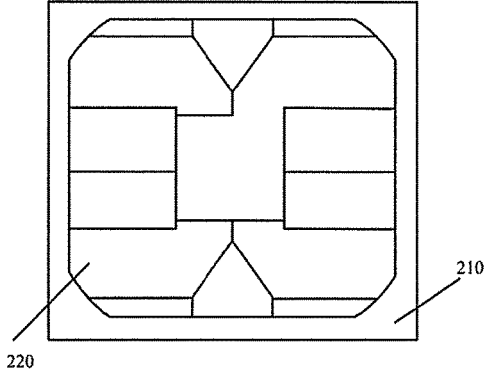
FIG. 2 shows a top view of an integrated module board according to an Embodiment of the present invention.
Figure 3:
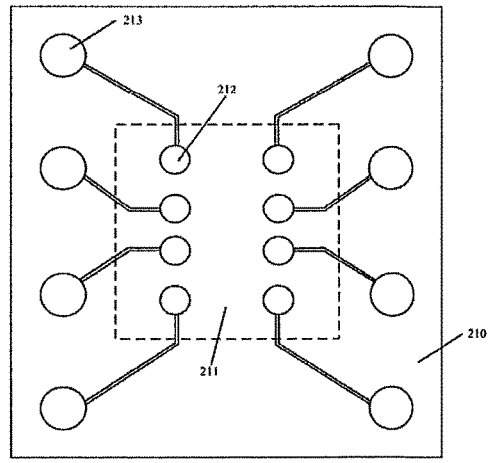
FIG. 3 shows a bottom view of the integrated module board according to an Embodiment of the present invention.
Figure 4:
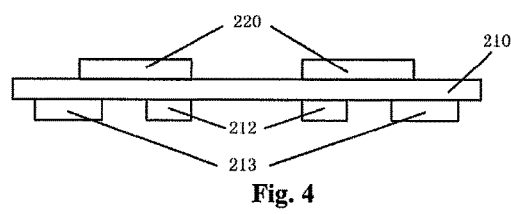
FIG. 4 shows a profile view of the integrated module board according to an Embodiment of the present invention.

In this case, conducting resin can be ACA or Isotropic Conductive Adhesive; the integrated module board 210 is a two-sided PCB or multiple-layered PCB, as shown in FIG. 2, FIG. 3 and FIG. 4, multiple contactors 220, which are insulated from each other, are set on one layer of the integrated module board 210, the other layer of the integrated module board includes a first preset area 211, multiple internal pads 212, which are insulated from each other, are laid in the first preset area 211, and multiple external pads 213, which are insulated from each other, are laid outside the first preset area 211, the number of the internal pads 212 is as same as the number of the external pads 213, both the numbers of them are as same as the number of pins of the security chip 230. The internal pads 212 and the external pads 213 are on the same layer of the integrated module board, each internal pad 212 connects to the corresponding external pad 213 via traverse which is on the same layer, and one internal pad 212 corresponds to one corresponding external pad 213.

It needs to be noted that the number of the internal pads 212 and the external pads 213 in the integrated module board 210 and the way of laying the internal pads 212 and the external pads 213 are not limit to the way as shown in FIG. 3, that is, the number of the internal pads 212 and the number of the external pads 213 are at least five respectively, that means the number can be five, can also be six or seven or more; the way of laying the pads can be two lines, can also be three lines or more, the pads can be also laid out in a shape of circle, trapezoid or triangle, etc., the above described are all in the protective scope of the present invention.

Preferably, contactors 220 are set on the top layer of the integrated module board 210, the first preset area 211 is included on the bottom layer of the integrated module board 210.

Besides, each contactor 220 on the integrated module board 210 connects to the corresponding internal pad 212 through, the via hole in the integrated module 210, and one contactor 220 corresponds one corresponding internal pad 212; each contactor 220 can connect to the corresponding external pad 213 on the integrated module board 210 through the via hole in the integrated module board 210, and one contactor 220 corresponds one corresponding external pad 213. Each contactor 220 on the integrated module board is configured to communicate and data interact with a card-reading device, the contactor 220 can be a component which is welded on the integrated module board 210, and can also be a pad preset on the integrated module board in a way of bonded copper.

Figure 5:
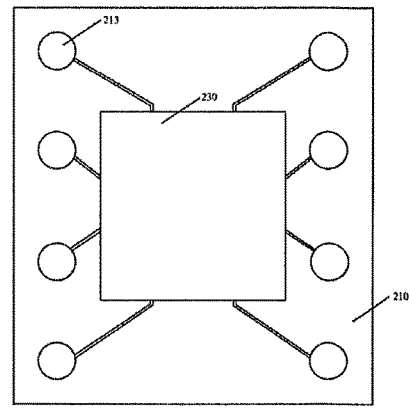
FIG. 5 shows a bottom view of a security chip module according to an Embodiment of the present invention.
Figure 6:
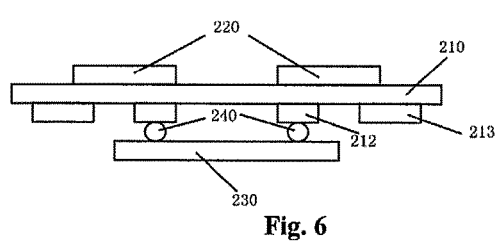
FIG. 6 shows one type of a profile view of the security chip module according to an Embodiment of the present invention.

In step 101, solder ball 240 can be planted on the pin of the security chip 230 and/or on the internal pad 212 on the integrated module board 210, each pin of the security chip 230 is aligned with the corresponding internal pad 212 on the integrated module board through the solder ball 240 to weld the security chip 230 on the integrated module board 210 and a security chip module which is composited of the security chip 230 and the integrated module board 210 is obtained, as shown in FIG. 5 and FIG. 6, in which one pin of the security chip 230 corresponds one corresponding internal pad 212.

Figure 7:
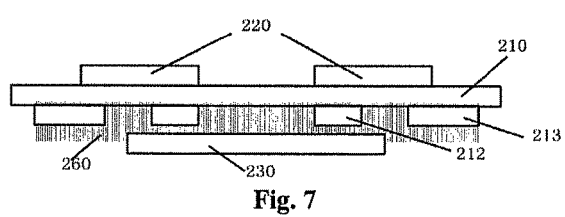
FIG. 7 shows another type of the profile view of the security chip module according to an Embodiment of the present invention.
Figure 8:
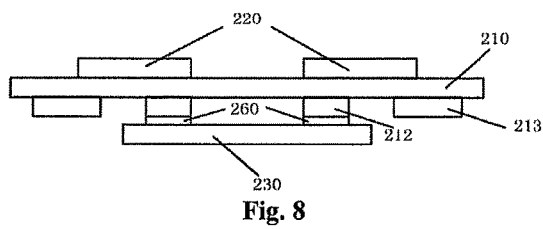
FIG. 8 shows the third type of the profile view of the security chip module according to an Embodiment of the present invention.

Conducting resin 260 can also be coated on the pin of the security chip 230 and/or on the internal pad 212 on the integrated module board 210, each pin of the security chip 230 is aligned with the corresponding internal pad 212 on the integrated module board 210, and the security chip 230 is pressed and heated to solidify the conducting resin 260 which is adhered to the security chip 230 to adhere the security chip 230 to the integrated module board 210 and obtain the security chip module composited of the security chip 230 and the integrated module board 210. Conducting resin can be ACA or isotropic conductive adhesive, the security chip module is shown in FIG. 7 and FIG. 8, in which one pin of the security chip 230 corresponds one corresponding internal pad 212.

It needs to be noted that the security chip module obtained by executing Step 101 can be an independent module or be included in a security chip carrier tape which is constitute of multiple security chip module, the above ways are all in the protective scope of the present invention.

Step 102, solder balls are planted on security chip pad of the main circuit board.

Figure 9:
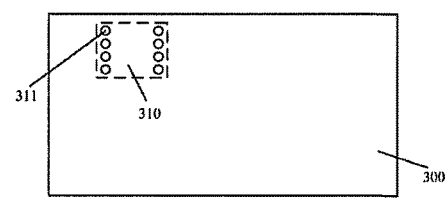
FIG. 9 shows a structural schematic view of a main circuit board according to an Embodiment of the invention.

In this case, the security chip pad 311 is in the second preset area 310 of the main circuit board 300, as shown in FIG. 9, the number of the security chip pads 311 is as same as the number of the external pads 213, which connects to the internal pads 212, on the integrated module board 210, every security chip pad 311 is insulated from each other.

Step 103, the main circuit board is connected to a displayer, keyboard and battery respectively to obtain an electronic component.

Figure 10:
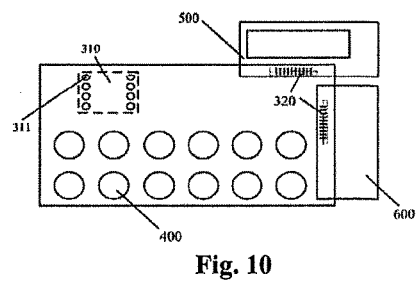
FIG. 10 shows a structural schematic view of electronic component according to an Embodiment of the present invention.

Specifically, one or multiple keys 400 can be assembled on the pad of the main circuit board 300, and the main circuit board 300 is connected to the displayer 500 and the battery 600 via an edge joint 320 to obtain the electronic component including the main circuit board 300, the security chip module, the displayer 500, the keys 400 and the battery 600, as shown in FIG. 10.

Step 104, the electronic component is filled in a notch of the base plate, the surface where the notch is located is coated with a binding agent, and the binding agent is smoothed.

Specifically, the main circuit board of the electronic component is filled in the bottom of a notch of the base plate, the surface where the notch is located is coated with a binding agent by means of an automatic applying device, and the binding agent is smoothed by means of a flexible cylinder.

Figure 11:
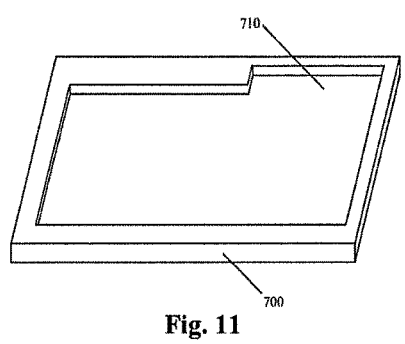
FIG. 11 shows a structural diagram of a base plate according to an Embodiment of the present invention.

In this case, the base plate 700, as shown in FIG. 11, has the notch 710.

Step 105, the base plate is executed laminating and laminating processes.

Figure 12:
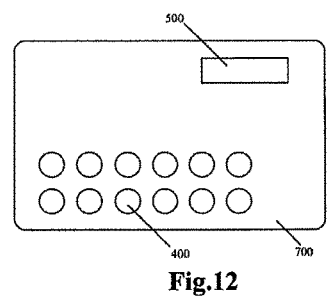
FIG. 12 shows a top view of a base plate which is filled with electronic component according to an Embodiment of the present invention.
Figure 13:
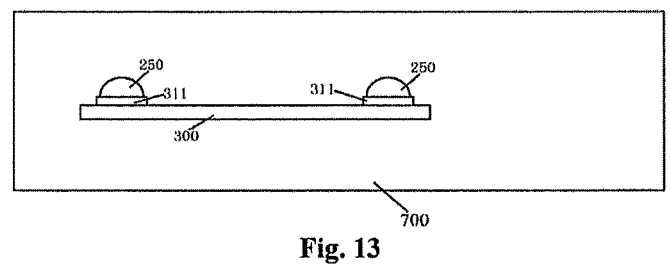
FIG. 13 shows a profile view of the base plate which is filled with electronic component according to an Embodiment of the present invention.

Specifically, the base plate is laminated by using a flexible roller, and the base plate is high-temperature laminated or medium-temperature laminated, the top view and the profile view is shown in FIG. 12 and FIG. 13. In this case, the area in the laminating, which corresponds to the displayer can be transparent or hollow; the area in the laminating, which corresponds to the keys can be transparent or opacity.

Step 106, a notch is milled on the base plate which is filled with the main circuit board according to the location of the security chip pad in the main circuit board to make the solder ball on the security chip pad visible at the bottom of the notch.

Specifically, the notch 800 is milled on the base plate which is filled with main circuit board 300 for the solder ball 250 on the security chip pad of the main circuit board 300 according to the volume and the structure of the security chip module, the bottom of the notch 800 includes a milled section of the solder ball on the security chip pad 311. In which, the deepest depth of the notch 800 is not smaller than the largest thickness of the security chip module.

Figure 14:
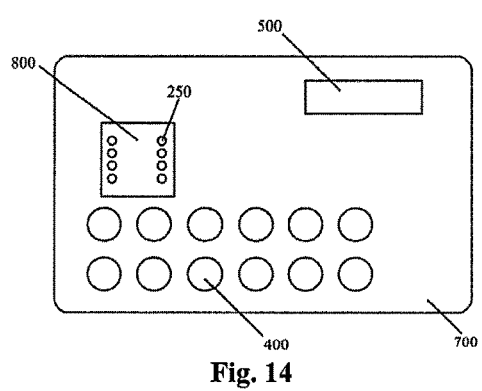
FIG. 14 shows a top view of one type of base plate on which a notch is milled according to an Embodiment of the present invention.
Figure 15:
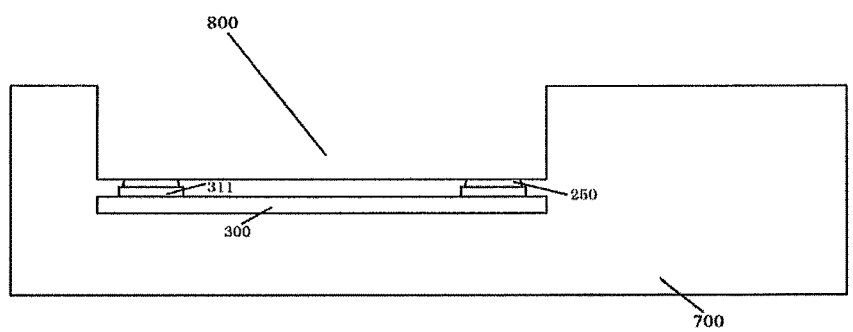
FIG. 15 shows a profile view of the base plate on which a notch is milled according to an Embodiment of the present invention.

In one embodiment of the present invention, the depth of each point of the notch 800 milled on the base plate is the same as each other, the top view and the profile view are as shown in FIG. 14 and FIG. 15.

Figure 16:
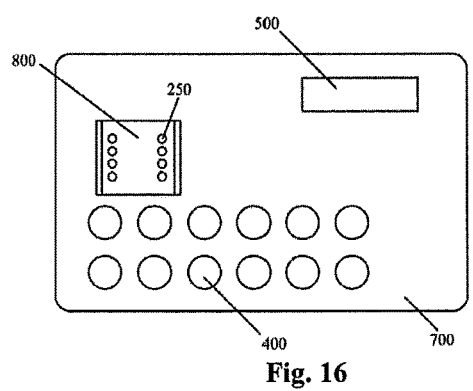
FIG. 16 shows a top view of another type of base plate on which a notch is milled according to an Embodiment of the present invention.
Figure 17:
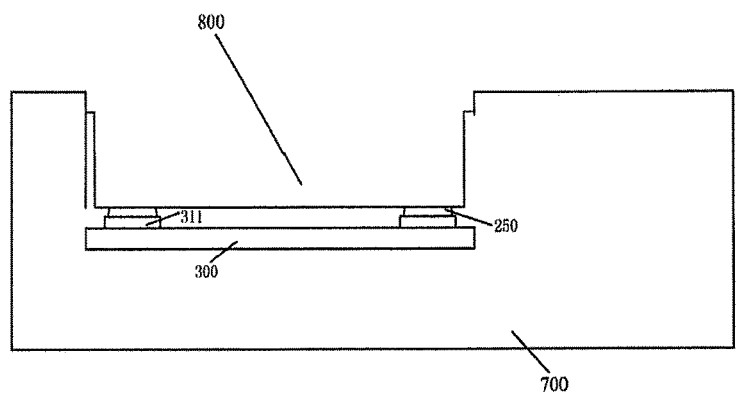
FIG. 17 shows a profile view of another type of base plate on which a notch is milled according to an Embodiment of the present invention.

In another embodiment of the present invention, the depth at the central of the notch 800 milled on the base plate is deeper than the depth at the edge of the notch 800, the profile of the notch 800 is the stair-shape, and the horizon base area of the central part of the notch 800 is smaller than the base area of the integrated module board 210 in the security chip module, it's top view and the profile view are shown in FIG. 16 and FIG. 17.

Figure 18:
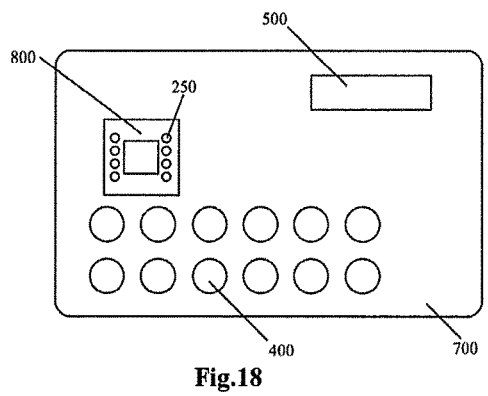
FIG. 18 shows a top view of the third type of base plate on which a notch is milled according to an Embodiment of the present invention.
Figure 19:
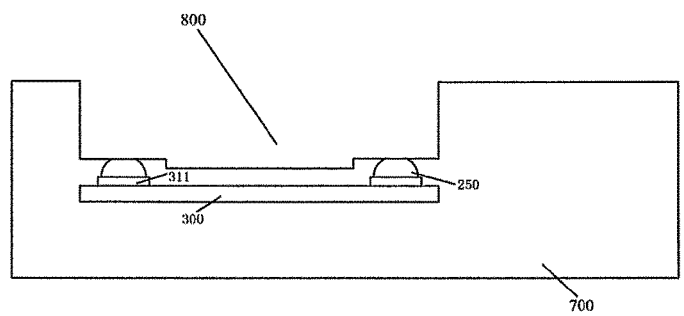
FIG. 19 shows a profile view of the third type of base plate on which a notch is milled according to an Embodiment of the present invention.

In further embodiment of the present invention, the depth at the central of the notch 800 milled on the base plate is deeper than the depth at the edge of the notch 800, the profile of the notch 800 is in stair-shape, and the central part of the notch 800 matches the security chip 230 in the security chip module, the top view and the profile view of the notch 800 are shown in FIG. 18 and FIG. 19 respectively. Specifically, the horizon base area of the central part of the notch 800 can be larger than the base area of the security chip 230 in the security chip module, or can also equal the base area of the security chip 230 in the security chip module.

Figure 20:
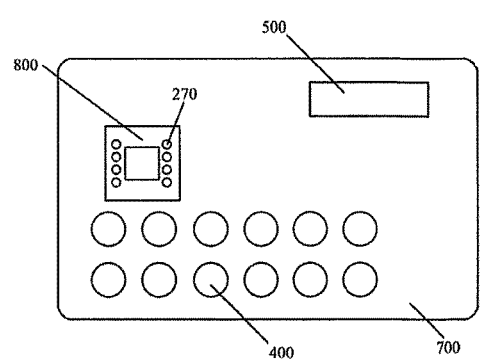
FIG. 20 shows a top view of the fourth type of base plate on which a notch is milled according to an Embodiment of the present invention.
Figure 21:
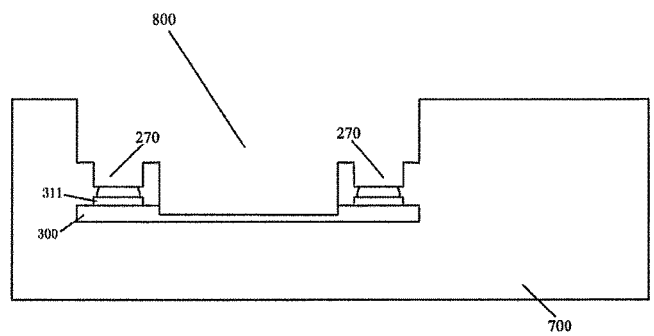
FIG. 21 shows a profile view of the fourth type of base plate on which a notch is milled according to an Embodiment of the present invention.

In another embodiment of the present invention, on the basis of the structure as shown in FIG. 18 and FIG. 19, there are multiple concave dots 270 at the bottom of the notch 800 milled on the base plate, and the number of the concave dots 270 is as same as the number of the security chip pads 311 in the main circuit board 300, the bottom of each concave dot 270 includes the section milled from the solder ball 250 on the security chip pad 311, and the horizon base area of each concave dot is not smaller than the area of the external pad 213 on the integrated module board 210, the top view and the profile view are shown in FIG. 20 and FIG. 21 respectively.

Step 107, the security chip module is filled in the notch of the base plate, and is assembled on the main circuit board via the solder balls on the security chip pad.

Specifically, the security chip module is assembled on the main circuit board through the coordination between the solder balls on the security chip pad and the external pad on the integrated module board.

In the present Embodiment, the security chip module can be filled in the notch of the base plate and be welded on the main circuit board via the solder balls on the security chip pad; or the security chip module can also be filled in the notch of the base plate and be adhered on the main circuit board via the solder balls on the security chip pad.

Furthermore, it can point tin cream on each external pad 213 on the integrated module board and/or on the section of each solder ball at the bottom of the notch of the base plate, align each external pad 213 on the integrated module board with the section of the corresponding solder ball 250 at the bottom of the notch of the base plate to weld the security chip module on the main circuit board 300; it can also coat conducting resin on each external pad 213 on the integrated module pad and/or on the section of each solder ball 250 at the bottom of the notch of the base plate, and align each external pad 213 on the integrated module board with the section of the corresponding solder ball 250 at the bottom of the notch of the base plate to adhere the security chip module on the main circuit board 300. In this case, one external pad 213 on the integrated module board corresponds one corresponding solder ball 250, the security chip 230 in the security chip module is between the main circuit board 300 and the integrated module board 210, all of the external pads 213, which is aligned with the security chip pad 311, connect to the internal pads 212 of the integrated module board 210; the conducting resin can be Anisotropic Conductive Adhesive or Isotropic Conductive Adhesive.

Figure 22:
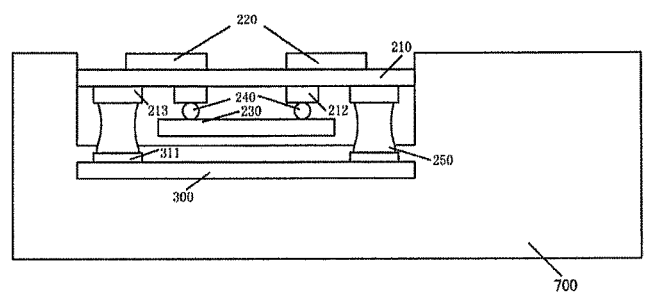
FIG. 22 shows one type of schematic view of welding a main circuit board with a security chip module according to the Embodiment of the present invention.
Figure 23:
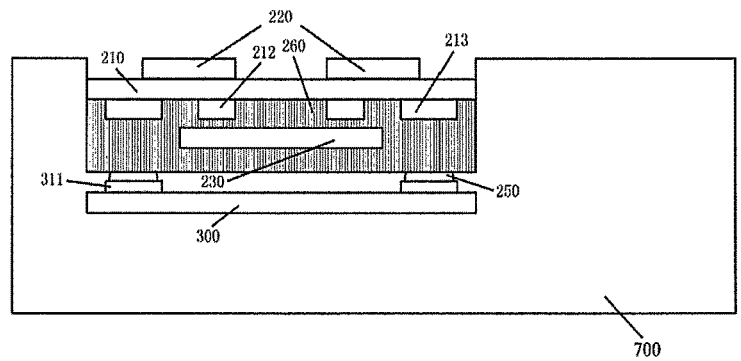
FIG. 23 shows one type of schematic view of adhering a main circuit board to a security chip module according to an Embodiment of the present invention.

In one embodiment of the present invention, it can point tin cream on each external pad 213 on the integrated module board and/or the section of the solder ball 250 corresponding to the bottom of the notch of the base plate when the top view and the profile view of the base plate which is milled a notch are shown in FIG. 14 and FIG. 15, weld the security chip module on the main circuit board 300, as shown in FIG. 22, according to the way of aligning each external pad 213 on the integrated module board with the section of the corresponding solder ball 250 at the bottom of the notch on the base plate; it can also coat ACA 260 on each external 213 on the integrated module board with the section of the corresponding solder ball at the bottom of the notch of the base plate to adhere the security chip module on the main circuit board 300, as shown in FIG. 23, in which one external pad 213 on the integrated module board corresponds one corresponding solder ball 250.

Figure 24:
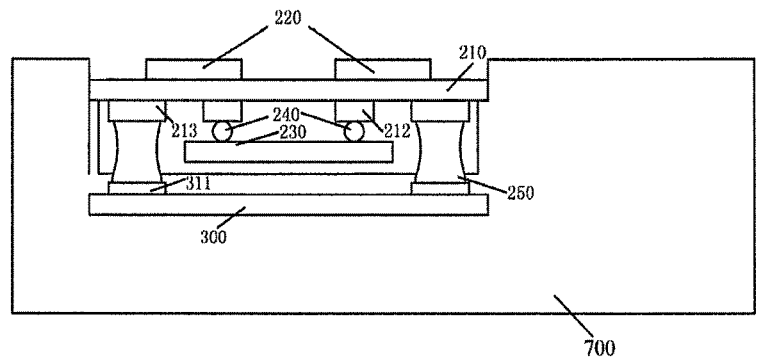
FIG. 24 shows another type of schematic view of welding a main circuit board with a security chip module according to an Embodiment of the present invention.
Figure 25:
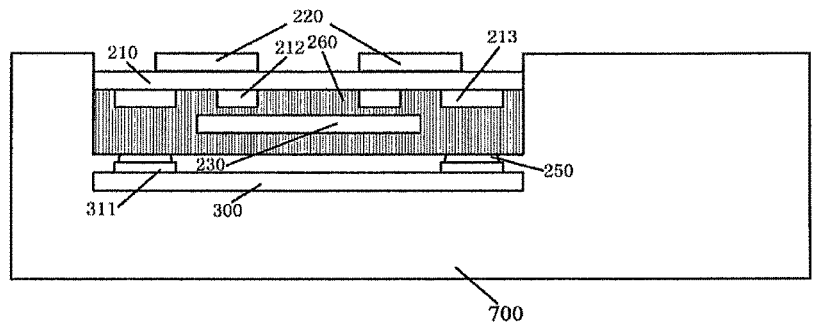
FIG. 25 shows another type of schematic view of adhering a main circuit board with a security chip module according to an Embodiment of the present invention.

In another embodiment of the present invention, it can point tin cream on each external pad 213 on the integrated module board and/or on the section of each solder ball 250 at the bottom of the notch of the base plate when the top view and the profile view of the base plate which is milled a notch are shown in FIG. 16 and FIG. 17 respectively, coordinate the integrated module board 210 in the security chip module with the edge part of the notch, weld the security chip module on the main circuit board 300, as shown in FIG. 24, according to the way of aligning each external pad 213 on the integrated module board with the section of the corresponding solder ball at the bottom of the notch of the base plate; it can also coat ACA 260 on each external pad 213 on the integrated module board and/or the section of the solder ball at the bottom of the notch of the base plate, coordinate the integrated module board 210 in the security chip board with the edge part of the notch, align each external pad 213 on the integrated module board with the section of the corresponding solder ball at the bottom of the notch of the base plate to adhere the security chip module on the main circuit board 300, as shown in FIG. 25, in which one external pad 213 on the integrated module board corresponds one corresponding solder ball 250.

Figure 26:
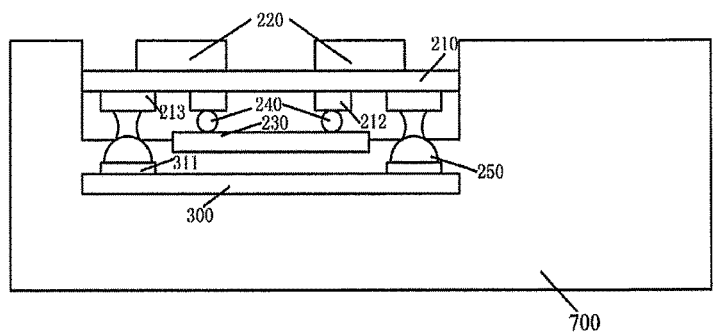
FIG. 26 shows the third type of schematic view of welding a main circuit board with a security chip module according to an Embodiment of the present invention.
Figure 27:
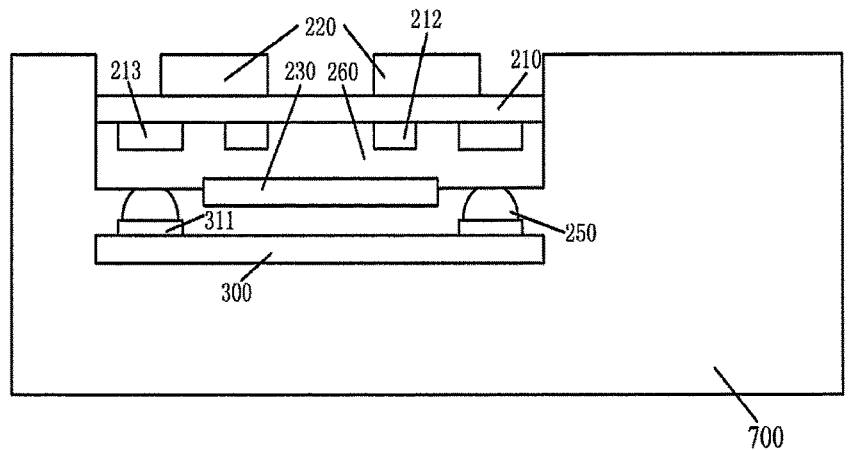
FIG. 27 shows the third type of schematic view of adhering a main circuit board to a security chip module according to an Embodiment of the present invention.

In another embodiment of the present invention, it can point tin cream on each external pad 213 on the integrated module board and/or each solder ball 250 at the bottom of the notch of the base plate when the top view and the profile view of the base plate which is milled a notch are shown in FIG. 18 and FIG. 19 respectively, coordinate the security chip 230 in the security chip module with the central part of the notch, weld the security chip module on the main circuit board 300, as shown in FIG. 26, according to the way of aligning each external pad 213 on the integrated module board with the section of the corresponding solder ball 250 at the bottom of the notch of the base plate; it can also coat ACA 260 on each external pad 213 on the integrated module board and/or the section of each solder ball 250 at the bottom of the notch of the base plate, coordinate the security chip 230 on the integrated module board with the central part of the notch, align each external pad 213 on the integrated module board with the section of the corresponding solder ball at the bottom of the notch of the base plate to adhere the security chip module on the main circuit board 300, as shown in FIG. 27, in which one external pad 213 on the integrated module board corresponds to one corresponding solder ball 250.

Figure 28:
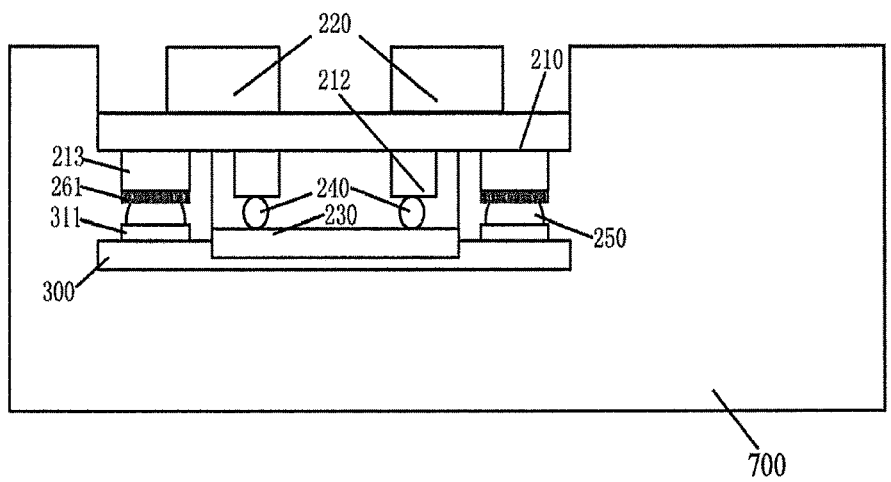
FIG. 28 shows the fourth type of schematic view of adhering a main circuit board to a security chip module according to an Embodiment of the present invention.

In another embodiment of the present invention, it can point tin cream on each external pad 213 on the integrated module board and/or the section of the solder ball 250 at the bottom of the notch of the base plate, coordinate the security chip 230 in the security chip module with the central part of the notch, and weld the security chip module on the main circuit board 300 according to the way of aligning each external pad 213 on the integrated module board with the section of the corresponding solder ball 250 at the bottom of the notch of the base plate; it can also coat conducting resin 261 on each external pad 213 on the integrated module board and/or the section of each solder ball 250 at the bottom of the notch of the base plate, coordinate the security chip 230 in the security chip module with the central part of the notch, and align each external pad 213 on the integrated module board with the section of the corresponding solder ball at the bottom of the notch of the base plate to adhere the security chip module on the main circuit board 300, as shown in FIG. 28. In this case, the conducting resin 261 can be ACA or ICA, and one external pad 213 on the integrated module board corresponds one corresponding solder ball 250.

Figure 29:
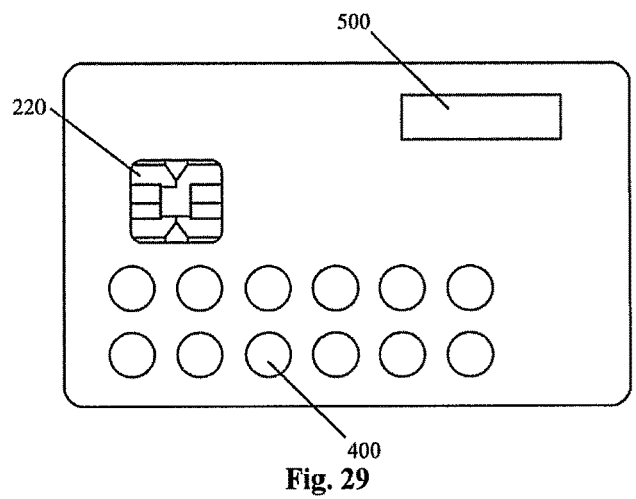
FIG. 29 shows a structural schematic view of a smart card according to an Embodiment of the present invention.

After above steps, a smart card is obtained as shown in FIG. 29.

In the Embodiment of the present invention, the security chip is assembled on the integrated module board through the coordination between the pin of the security chip and the internal pad on the integrated module board to obtain the security chip module; and the security chip module is assembled on the main circuit board through the coordination between the solder balls on the security chip pad of the main circuit board and the external pad on the integrated module board; the location of the security chip pad on the main circuit board can be adjusted according to the wiring acquirement because the location of the external pad on the integrated module board can be adjusted, in this way, there is less limits for wiring for the main circuit board caused by the contactors on the surface of the smart card, thus, quality of wiring of the main circuit board is improved.

It needs to be noted that the main circuit board connects to the displayer, the keys and the battery respectively in the Embodiment of the present invention to obtain an electronic component, and the electronic component is filled in the notch of the base plate; the main circuit board can be filled in the notch of the base plate alone in other mode of execution, the object of the present invention can be realized.

In another embodiment of the present invention, addition to laminating and laminating processes, the base plate can be processed in other way before the base plate, which is filled with main circuit board, is milled a notch according to the location of the security chip pad on the main circuit board.

Based on the above method for making a smart card, it provides a smart card according to the Embodiment of the present invention, which includes a base plate and a main circuit board filled in the base plate, solder balls are planted on the security chip pad in the main circuit board, there is a notch in the location of the base plate which corresponding to the security chip pad, the solder balls on the security chip pad is visible at the bottom of the notch.

In this case, a security chip module is filled in the notch, the security chip module is assembled on the main circuit board via the solder balls on the security chip pad; the security chip module includes an integrated module board and the security chip assembled on the integrated module board, multiple contactors, which are insulated from each other, are set on one layer of the integrated module board.

Furthermore, the contactors can be set on the top layer of the integrated module board.

Furthermore, multiple internal pads are set on the integrated module board, the security chip is assembled on the integrated module board through the coordination between the pin of the security chip and the internal pad on the integrated module board.

Specifically, the security chip can be welded on the integrated module board, can also be adhered on the integrated module board via conducting resin.

In the embodiment of the present invention, each pin of the security chip is welded with the corresponding internal pad on the integrated module board via the solder ball planted on the security chip and/or the solder ball planted on the internal pad on the integrated module board, in which one pin of the security chip corresponds one corresponding internal pad.

Each pin of the security chip can be adhered to the corresponding internal pad on the integrated module board via conducting resin coated on the security chip and/or conducting resin coated on the internal pad on the integrated module board, in which one pin of the security chip corresponds to one corresponding internal pad.

In this case, each contactor on the integrated module board connects to the corresponding internal pad on the integrated module through the hole in the integrated module board, and one contactor corresponds one corresponding internal pad.

Furthermore, there are multiple external pads set on the integrated module board, each internal pad connects to the corresponding external pad, and one internal pad corresponds to one corresponding external pad; the security chip module is assembled on the main circuit board through coordination between the solder balls on the security chip pad and the external pad on the integrated module board.

Specifically, the security chip module is welded or adhered on the main circuit board through the solder balls on the security chip pad.

Correspondingly, each external pad on the integrated module board can be welded with the section of the corresponding solder ball at the bottom of the notch through tin cream on the external pad and/or on the section of each solder ball at the bottom of the notch, in which one external pad corresponds to one corresponding solder ball.

Each external pad on the integrated module board can also be adhered to the section of the corresponding solder ball at the bottom of the notch through conducting resin on the external pad and/or conducting resin on the section of each solder ball at the bottom of the notch, in which one external pad corresponds to one corresponding solder ball.

In this case, each contactor on the integrated module board connects to the corresponding external pad through via hole in the integrated module board, and one contactor corresponds to one corresponding external pad.

Furthermore, the number of the security chip pads equals the number of the external pads which connect to the internal pads on the integrated module board, and the security chip pads are insulated from each other.

Furthermore, the notch matches the volume and the structure of the security chip module, the bottom of the notch includes the milled section of the solder ball on the security chip pad.

Furthermore, the depth of every point of the notch is same; correspondingly, each external pad on the integrated module board adheres to the section of the corresponding solder ball at the bottom of the notch through ACA on the external pad and/or ACA on the section of each solder ball at the bottom of the notch, in which one external pad corresponds to one corresponding solder ball.

Furthermore, the depth at the central of notch can be deeper than the depth at the edge of the notch, the profile of the notch is a stair-shape, the horizon base area of the central part of the notch is smaller than the base area of the integrated module board of the security chip module; correspondingly, the integrated module board in the security chip module coordinates with the edge part of the notch; each external pad on the integrated module board adheres to the section of the corresponding solder ball at the bottom of the notch through ACA on the external pad and/or ACA on the section of each solder ball at the bottom of the notch, in which one external pad corresponds to one corresponding solder ball.

Furthermore, the depth at the central of the notch can also be deeper than the depth of the edge of the notch, the profile of the notch is the stair-shape, and the central part of the notch matches the security chip in the security chip module; the security chip in the security chip module coordinates with the central part of the notch; each external pad on the integrated module board adheres to the section of the corresponding solder ball at the bottom of the notch through ACA on each external pad and/or ACA on the section of each solder ball at the bottom of the notch, in which one external pad corresponds to one corresponding solder ball.

Furthermore, the depth at the central of the notch is deeper than the depth at the edge of the notch, the profile of the notch is the stair-shape, and the central part of the notch matches the security chip in the security chip module; there are multiple concave dots at the bottom of the notch, the number of the concave dots is as same as the number of the security chip pads in the main circuit board, the bottom of each concave dot includes the milled section of the solder ball on the security chip pad, and the horizon base area of each concave dot is not smaller than the area of the external pad on the integrated module board; the security chip in the security chip module coordinates with the central part of the notch, and each external pad on the integrated module board aligns with the section of the solder ball at the bottom of the corresponding concave dot.

In the present invention, the security chip is assembled on the integrated module board through coordination between the pin of the security chip and the external pads on the integrated module board to obtain the security chip module, and the security chip module is assembled on the main circuit board through coordination between the solder balls on the security chip pads of the main circuit board, the location of the security chip pad on the main circuit board can be adjusted according to the wiring requirement because the location of the external pads on the integrated module board can be adjusted, in this way, it improves quality of wiring of the main circuit board because the limits caused by the contactors on the surface of the smart card for the main circuit board became less.

Figure 30:
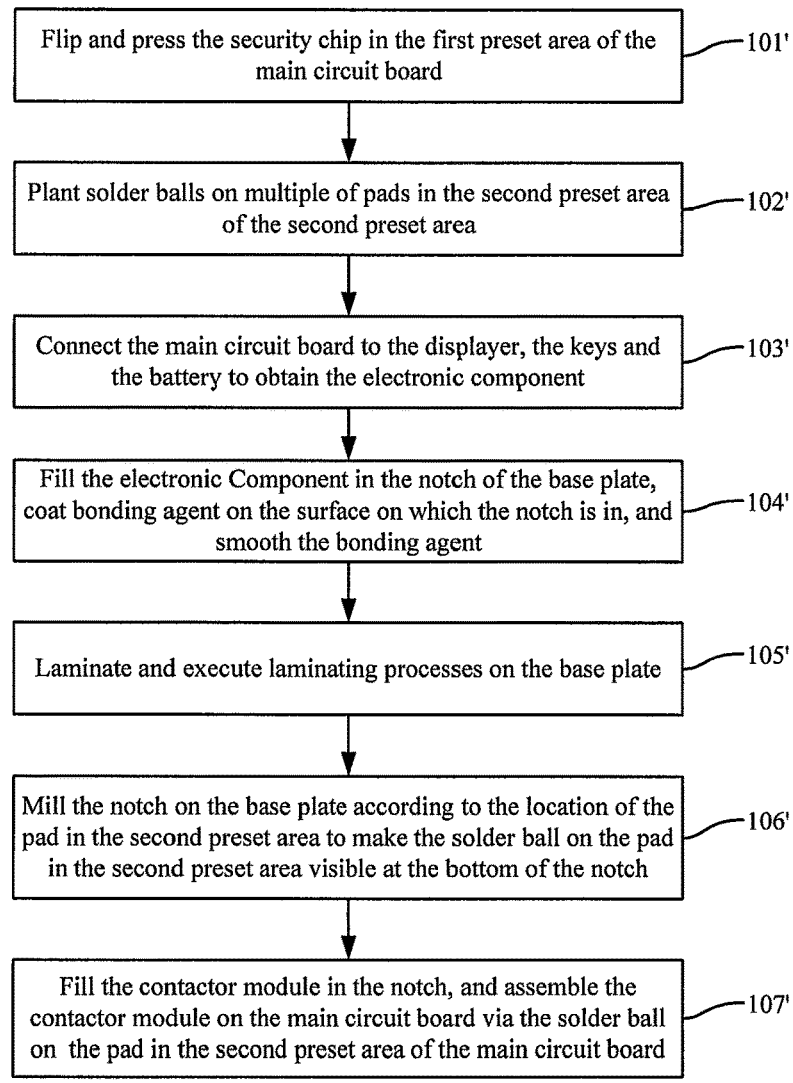
FIG. 30 shows a flow chart of a method for making a smart card according to an Embodiment of the present invention.

It provides a method for making a smart card according to the Embodiment of the present invention, as shown in FIG. 30, which includes following steps:

Step 101', a security chip is flipped and pressed in a first preset area of a main circuit board.

Specifically, the security chip can be welded in the first preset area of the main circuit board; the security chip can also be adhered in the first preset area of the main circuit board via conducting resin.

Figure 31:
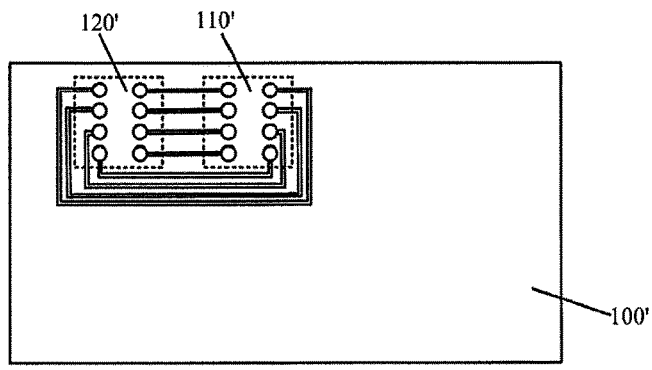
FIG. 31 shows a schematic view of a pad on the main circuit board according to an Embodiment of the present invention.

In this case, there are multiple pads set in the first preset area 110' of the main circuit board 100', as shown in FIG. 31, the number of the pads in the first preset area 110' is as same as the number of pins 210' of the security chip 200', and pads in the first preset area 110' are insulated from each other.

Figure 32:
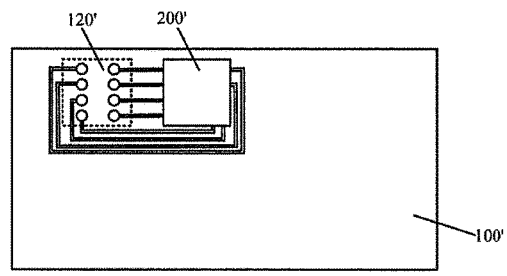
FIG. 32 shows a top view of a security chip and a main circuit board according to an Embodiment of the present invention.
Figure 33:
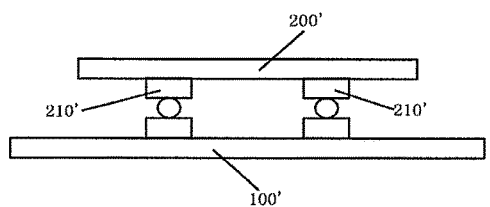
FIG. 33 shows one type of profile view of the security chip and the main circuit board according to an Embodiment of the present invention.

In Step 101', solder balls can be planted on the pins 210' of the security chip 200' and/or on the pads in the first preset area 110', each pin of the security chip 200' is aligned with the corresponding pad in the first preset area 110' via a solder ball to weld the security chip 200' in the first preset area 110' of the main circuit board 100', the top view and the profile view is shown in FIG. 32 and FIG. 33 respectively, in which one pin of the security chip 200' corresponds to one corresponding pad in the first preset area 110'.

Figure 34:
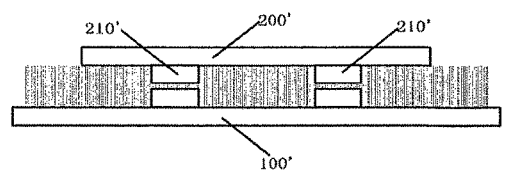
FIG. 34 shows another type of profile view of the security chip and the main circuit board according to the Embodiment of the present invention.
Figure 35:
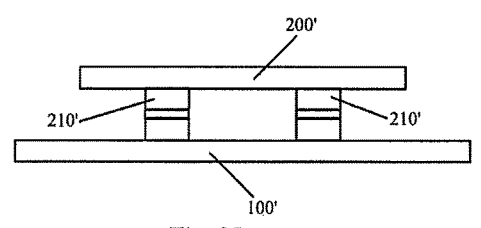
FIG. 35 shows the third type of profile view of the security chip and the main circuit board according to an Embodiment of the present invention.

It can coat conducting resin on the pins 210' of the security chip 200' and/or on the pads in the first preset area 110', align each pin 210' of the security chip 200' with the corresponding pad in the first preset area 110', and heat and press the security chip 200' to solidify conducting resin which adheres to the security chip 200', the security chip 200' is welded in the first preset area 110' of the main circuit board 100'. In this case, one pin 210' of the security chip 200' corresponds to one corresponding pad in the first preset area 110'; the conducting resin can be Anisotropic Conductive Adhesive or Isotropic Conductive Adhesive. The top view and the profile view are shown in FIG. 32 and FIG. 34 respectively in the case that the conducting resin is ACA; the corresponding top view and the profile view are shown in FIG. 32 and FIG. 35 respectively in the case that the conducting resin is ICA.

Step 102', solder balls are planted on multiple pads in the second preset area of the main circuit board.

In this case, there are multiple pads set in the second preset area 120' of the main circuit board, the pads in the second preset area 120' are insulated from each other. Each pad in the first preset area 110' connects to the corresponding pad in the second preset area 120' via traverse on the main circuit board 100', and one pad in the first preset area 110' corresponds to one corresponding pad in the second preset area 120', as shown in FIG. 31.

Step 103', the main circuit board is connected to a displayer, keys and a battery respectively to obtain an electronic component.

Figure 36:
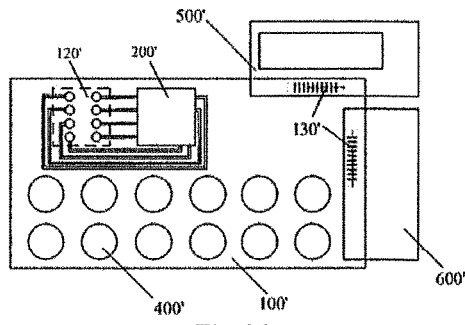
FIG. 36 shows a schematic view of electronic component according to an Embodiment of the present invention.

Specifically, it can assemble one key or multiple keys 400' on the pads in a third preset area of the main circuit board 100', the main circuit board 100' connects to the displayer 500' and the battery 600' via a side joint 130' respectively to obtain the electronic component which includes the main circuit board 100', the security chip 200', the displayer 500', keys 400' and the battery 600', as shown in FIG. 36.

Step 104', the electronic component is filled into the notch of the base plate, the surface which has the notch is coated bonding agent, and the bonding agent is smoothed.

Specifically, the main circuit board in the electronic component is filled at the bottom of the notch of the base plate, the bonding agent is well-distributed coated on the surface which has the notch by using an auto coating device, and the bonding agent is smoothed by a flexible roller.

Figure 37:
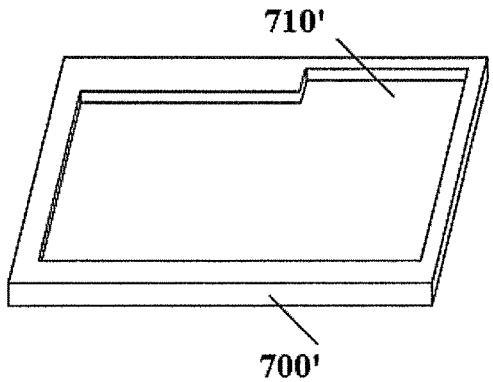
FIG. 37 shows a schematic view of a base plate according to an Embodiment of the present invention.

In this case, the structure of the base plate 700' is shown in FIG. 37, which has a notch 710'.

Step 105', the base plate is executed laminating and laminating processes.

Figure 38:
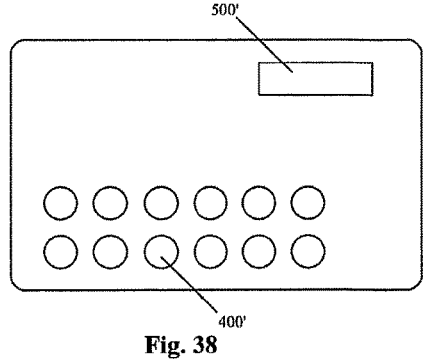
FIG. 38 shows a top view of a base plate which filled with electronic component according to an Embodiment of the present invention.
Figure 39:
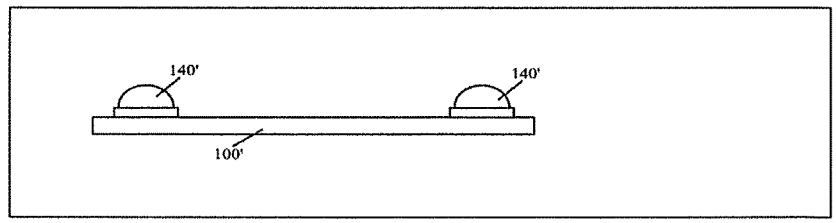
FIG. 39 shows a profile view of the base plate which filled with electronic component according to an Embodiment of the present invention.

Specifically, the base plate is laminated by using a flexible roller, and the base plate is high-temperature laminated or medium-temperature laminated. In which there are multiple pads set in the second preset area 120' of the main circuit board 100', a solder ball 140' is planted on each pads, the top view and the profile view are shown in FIG. 38 and FIG. 39 respectively. In this case, the area in the laminating, which corresponds to the displayer can be transparent or hollow; the area in the laminating, which corresponds to the keys can be transparent or opacity.

Step 106', a notch is milled on the base plate according to the location of pads in the second preset area to make the solder balls on the pads in the second preset area visible at the bottom of the notch.

Specifically, the notch 800' is milled on the base plate for solder balls 140' on the pads in the second preset area 120' according to the volume and the structure of the contactor module 300', and the bottom of the notch 800' includes the milled section of the solder ball 140' on the pad in the second preset area 120'.

In this case, the base area of the notch 800' is not smaller than the base area of the contactor module 300', the deepest depth of the notch 800' is not deeper than the thickest thickness of the contactor module 300'.

Figure 40:
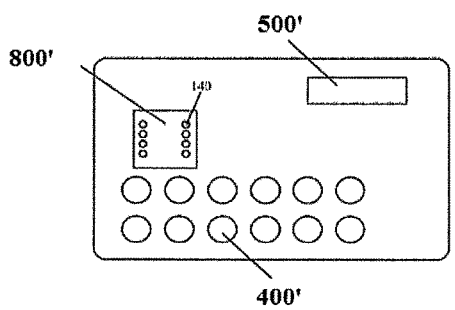
FIG. 40 shows a top view of one type of smart card in which a notch is milled according to an Embodiment of the present invention.
Figure 41:
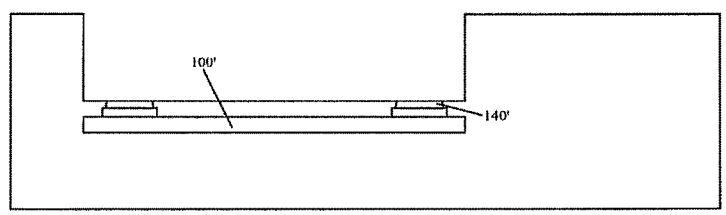
FIG. 41 shows a profile view of one type of smart card in which a notch is milled according to an Embodiment of the present invention.

In one embodiment of the present invention, the depth of every point of the notch 800' are same, the top view and the profile view are shown in FIG. 40 and FIG. 41 respectively.

Figure 42:
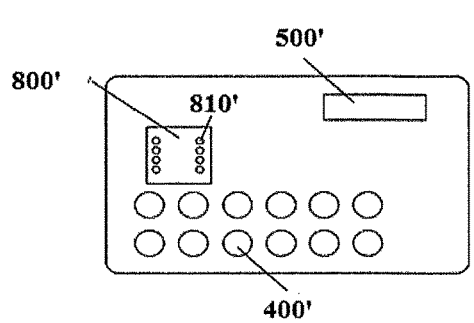
FIG. 42 shows a top view of another type of smart card in which a notch is milled according to an Embodiment of the present invention.
Figure 43:
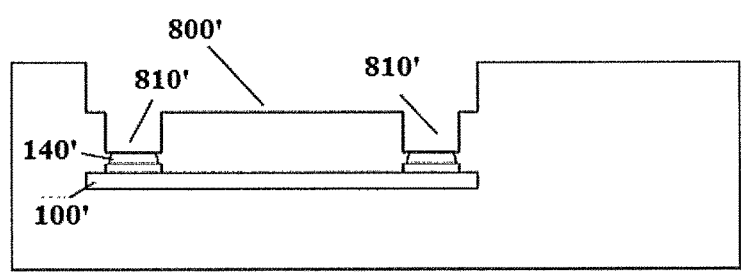
FIG. 43 shows a profile view of another type of smart card in which a notch is milled according to an Embodiment of the present invention.

In another embodiment of the present invention, there are multiple concave dots 810' at the bottom of the notch 800', the number of the concave dots 810' equals the number of the pads in the second preset area 120', the bottom of each concave dot 810' includes the milled section of the solder ball 140' on the pad in the second preset area 120', and the horizon base area of each concave dot 810' is not smaller than the area of the corresponding pin 320' in the contactor module 300', the top view and the profile view are shown in FIG. 42 and FIG. 43 respectively.

Step 107', the contactor module is filled in the notch, and is assembled on the main circuit board via solder balls on the pads in the second preset area of the main circuit board.

Figure 44:
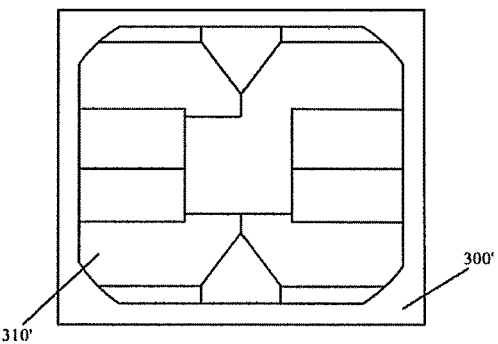
FIG. 44 shows a top view of a contactor module according to an Embodiment of the present invention.
Figure 45:
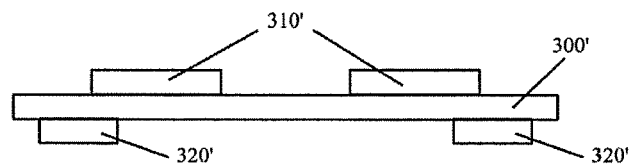
FIG. 45 shows a profile view of a contactor module according to an Embodiment of the present invention.

In this case, the contactor module 300' includes multiple contactors 310' which are insulated from each other and pins 320' corresponding every pin 310', each contactor 310' connects to the corresponding pin 320', and one contactor 310' corresponds to one pin 320, the number of the pins 320' in the contactor module 300' equals the number of pads in the second preset area 120' of the main circuit board 100', the top view and the profile view are shown in FIG. 44 and FIG. 45.

Correspondingly, it can plant solder balls on the pins 320' of the contactor module 300', each pin 320' of the contactor module 300' is aligned with the solder ball on the corresponding pad in the second preset area 120' via the solder ball, the contactor module 300' is filled in the notch 800' to weld the contactor module 300' on the main circuit board 100', in which one pin 320 of the contactor module 300' corresponds to one pad in the second preset area 120'.

It also can coat conducting resin on the pins 320' of the contactor module 300' and/or on the solder balls on the pads in the second preset area 120', each pin 320' of the contactor module 300' is aligned with the solder ball on the corresponding pad in the second preset area 120', the contactor module 300' is filled in the notch 800', and the contactor module 300' is heated and pressed to solidify the conducting resin which is on the contactor module 300', in which one pin 320' of the contactor module 300' corresponds to one pad in the second preset area 120'.

Figure 46:
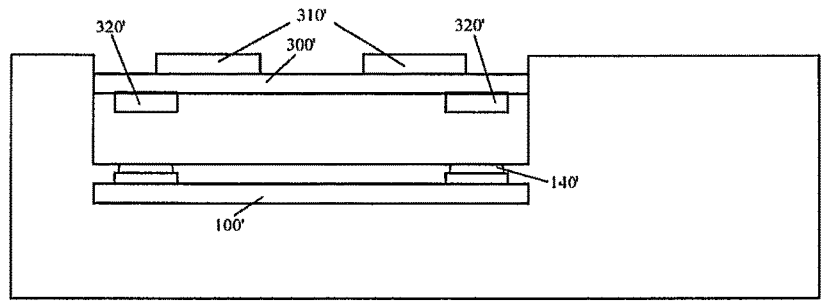
FIG. 46 shows a schematic view of one type of contactor module and main circuit board according to an Embodiment of the present invention.

In one embodiment of the present invention, coat ACA on the pins 320' of the contactor module 300' and/or the solder balls 140' on the pads in the second preset area when the top view and the profile view of the notch 800' are shown in FIG. 40 and FIG. 41 respectively, each pin 320' of the contactor module 300' is aligned with the solder ball 140' on the corresponding pad in the second preset area 120' respectively according to a preset corresponding relation by using a locating device or a video amplifier system, and then the contactor module 300' is assembled in the notch 800' by a chip mounter using preset pressure, and the contactor module 300' is heated to solidify ACA which in on the contactor module 300', the structure is shown in FIG. 46.

Figure 47:
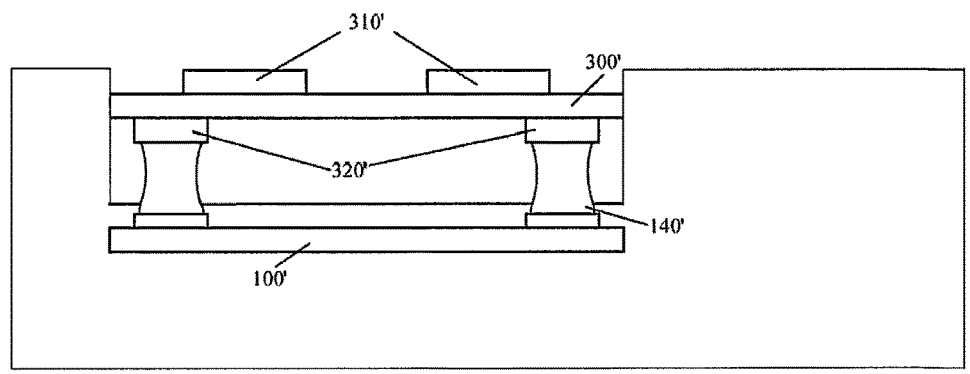
FIG. 47 shows a schematic view of another type of contactor module and main circuit board according to an Embodiment of the present invention.

In another embodiment of the present invention, plant solder balls on the pins 320' of the contactor module 300' when the top view and the profile view of the notch 800' are shown in FIG. 40 and FIG. 41 respectively, each pin 320' of the contactor module 300' is aligned with solder ball on the corresponding pad in the second preset area 120' via the solder ball by using the locating device or the video amplifier system according to the preset corresponding relation, and then the contactor module 300' is filled in the notch 800' to weld the contactor module 300' on the main circuit board 100', as shown in FIG. 47.

Figure 48:
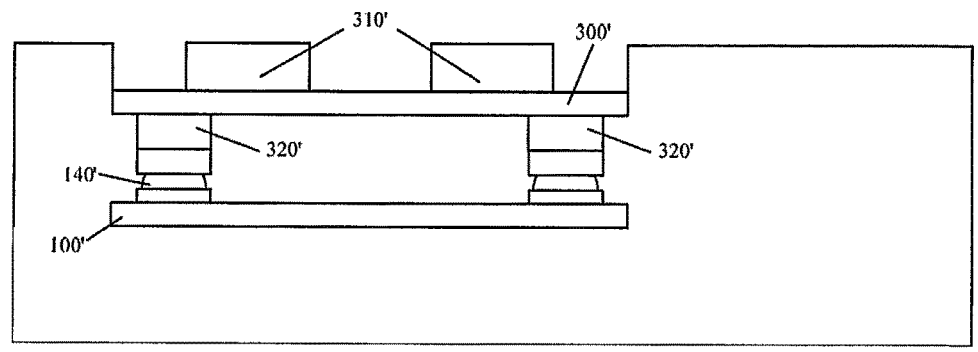
FIG. 48 shows a schematic view of the third type of contactor module and main circuit board according to an Embodiment of the present invention.

In another embodiment of the present invention, coat conducting resin on each pin 320' of the contactor module 300' and/or on the section of the solder ball 140' at the bottom of the concave dot 810, each pin 320' of the contactor module 300' is aligned with the section of the solder ball 140' at the bottom of the corresponding concave dot 810 by using the locating device or the video amplifier system according to the preset corresponding relation, and then the contactor module 300' is mounted in the notch 800' by the chip mounter using the preset pressure, and the contactor module 300' is heated to solidify the conducting resin which is on the contactor 300', in this way, the contactor module 300' is adhered on the main circuit board 100', as shown in FIG. 48. In this case, one pin 320' of the contactor module 300' corresponds to one concave dot 810'.

Figure 49:
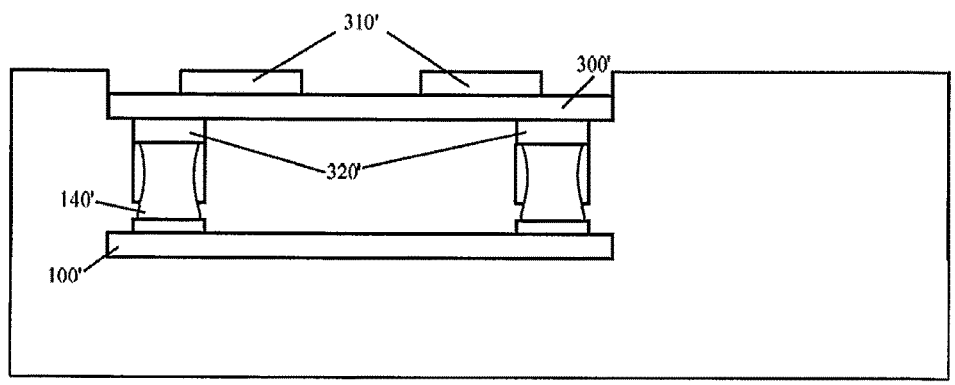
FIG. 49 shows a schematic view of the fourth type of contactor module and main circuit board according to an Embodiment of the present invention.

In another embodiment of the present invention, plant solder balls on the pins 320' of the contactor module 300' when the top view and the profile view of the notch 800' are shown in FIG. 42 and FIG. 43 respectively, each pin 320' of the contactor module 300' is aligned with the solder ball on the corresponding pad in the second preset area 120' via the solder ball by using the locating device or the video amplifier system according to the preset corresponding relation, and then the contactor module 300' is filled in the notch 800' to weld the contactor module 300' on the main circuit board 100', as shown in FIG. 49.

Figure 50:
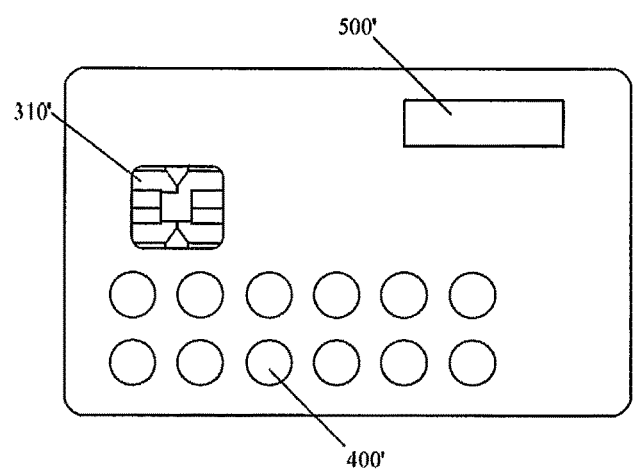
FIG. 50 shows a schematic view of a smart card made according to an Embodiment of the present invention.

A smart card, as shown in FIG. 50, is obtained after the above steps.

The contactor module and the security chip are assembled on the main circuit board according to the Embodiment of the present invention, which can expand an electronic circuit level, in this way, the expandability of the smart card can be improved.

It needs to be noted that the main circuit board connects to the displayer, the keys and the battery respectively in the Embodiment of the present invention to obtain an electronic component, and the electronic component is filled in the notch of the base plate; in other realization mode of the present invention, the main circuit board can be filled into the notch of the base plate alone, the object can be realized in this way.

In other embodiments of the present invention, addition to laminating and laminating processes, the base plate can be processed in other way before the base plate, which is filled with main circuit board, is milled a notch according to the location of the security chip pad on the main circuit board.

Based on the above method for making a smart card, it provides a smart card according to the Embodiment of the present invention, which includes a base plate and a main circuit board which is filled in the base plate, a security chip is flipped and pressed in the first preset area of the main circuit board, solder balls are planted on multiple of pads in the second preset area of the main circuit board, there is a notch in the base plate where corresponds to pads in the second preset area, the solder balls on the pads in the second preset area is visible at the bottom of the notch; there is a contactor module filled in the notch, and the contactor module is assembled on the main circuit via the solder balls on the pads in the second preset area.

In this case, the surface of the base plate which has the notch can be coated with bonding agent.

Furthermore, the security chip can be welded in the first preset area of the main circuit board or be adhered in the first preset area of the main circuit board via conducting resin.

Furthermore, there are multiple pads set in the first preset area of the main circuit board, the number of the pads in the first preset area equals the number of the pins of the security chip, and the pads in the first preset area are insulated from each other.

Correspondingly, each pin of the security chip is welded on the corresponding pad in the first preset area via the solder ball planted on the pin and/or the solder ball planted on the corresponding pad in the first preset area; each pin of the security chip can also be adhered on the corresponding pad in the first preset area via conducting resin coated on the pin and/or conducting resin coated on the corresponding pad in the first preset area, in which one pin of the security chip corresponds to one pad in the first preset area.

In this case, each pad in the first preset area connects to the corresponding pad in the second preset area via traverse on the main circuit board, and one pad in the first preset area corresponds to one pad in the second preset area, and the pads in the second preset area are insulated from each other.

Furthermore, the notch in the base plate matches with the volume and the structure of the contactor module, the bottom of the notch includes the milled section of the solder ball on the pads in the second preset area.

Furthermore, the contactor module includes multiple contactors which are insulated from each other and pin which corresponds to each contactor, the number of the pins in the contactor module equals the number of pads in the second preset area.

Correspondingly, there are solder balls planted on the pin of the contactor module, each pin of the contactor module is welded with the solder ball on the corresponding pad in the second preset area via solder balls, in which one pin of the contactor module corresponds to one pad in the second preset area.

Each pin of the contactor module can be adhered with the solder ball on the corresponding pad in the second preset area via conducting resin coated on the pin and/or conducting resin coated on the solder ball on the corresponding pad in the second preset area, in which one pin of the contactor module corresponds to one pad in the second preset area.

In this case, the conducting resin is ACA in the case that the depths of every point of the notch are same.

Each pin of the contactor module is adhered with the section of the solder ball at the bottom of the corresponding concave dot via conducting resin coated on the pin and/or conducting resin coated on the section of the solder ball at the bottom of the corresponding concave dot in the case that there are multiple concave dots at the bottom of notch, the number of concave dots equals the number of pads in the second preset area, the bottom of each concave dot includes the milled section of the solder ball on the pad in the second preset area, and the horizon base area of each concave dot is not smaller than the area of the corresponding pin in the contactor module, in which one pin of the contactor module corresponds to one concave dot.

It can expand the electronic circuit level of the contactor module and the security chip because the contactor module and the security chip are assembled on the main circuit board respectively according to the Embodiment of the present invention, in this way, the expandability of the smart card is improved.

The described embodiments are only preferred embodiments of the application and the embodiments are not intended to limit the application. Any alteration or change easily obtained by those skilled in the art based on the application should fall in the scope of protection of the application.

The invention claimed is:

1. A method for making a smart card, wherein said method comprises the following steps:
assembling a security chip on an integrated module board to obtain a security chip module, setting multiple contactors, which are insulated from each other, on one layer of the integrated module board; planting a solder ball on a security chip pad of a main circuit board, milling to form a notch on a base plate which is filled with the main circuit board to make the solder ball, which is located on the pad of the security chip, visible at the bottom of the notch according to a position of the solder ball on the security chip pad of the main circuit board;
filling the security chip module in the notch, and assembling the security chip module on the main circuit board via the solder ball on the security chip pad,
there are provided multiple internal pads on the integrated module board;
assembling the security chip on the integrated module board to obtain the security chip module specifically comprises:
assembling the security chip on the integrated module board to obtain the security chip module via engagement with each other between a pin of the security chip and the internal pad on the integrated module board,
there are provided multiple external pads on the integrated module board, each internal pad connects to one corresponding external pad, and each internal pad aligns with one specific external pad;
assembling the security chip module on the main circuit board via the solder ball on the security chip pad specifically comprises:
assembling the security chip module on the main circuit board via engagement with each other between the solder ball on the security chip pad and the external pad on the integrated module board,
a depth at a central part of the notch is deeper than a depth at an edge of the notch, a profile of the notch is a stair-shape, a central part of the notch matches with the security chip in the security chip module; there are multiple concave dots at the bottom of the notch, the number of the concave dots equals the number of security chip pads in the main circuit board, a bottom of each concave dot includes a milled section of the solder ball on the security chip pad, and a horizontal base area of each concave dot is not smaller than a base area of the external pad on the integrated module board;
assembling the security chip module on the main circuit board via engagement with each other between the solder balls on the security chip pad and the external pads on the integrated module board specifically comprises:
pointing tin cream on each external pad on the integrated module board and/or a section of the solder ball at the bottom of each notch, engaging the security chip in the security chip module with the central part of the notch, and welding the security chip module on the main circuit board according to a process for aligning each external pad on the integrated module board with the section of the solder ball at the bottom of the corresponding notch, in which each external pad corresponds one specific solder ball; or,
coating conducting resin on each external pad on the integrated module board and/or a section of the solder ball at the bottom of each notch, engaging the security chip in the security chip module with the central part of the notch, aligning each external pad on the integrated module board with the section of the solder ball at the bottom of the corresponding notch to adhere the security chip module on the main circuit board, in which each external pad corresponds one specific solder ball.

2. The method as claimed in claim 1, wherein, assembling the security chip on the integrated module board to obtain the security chip module via engagement with each other between the pin of the security chip and the internal pad on the integrated module board specifically comprises:
planting a solder ball on the pin of the security chip and/or on the internal pad on the integrated module board, aligning each pin of the security chip with the corresponding internal pad on the integrated module board via the solder ball to weld the security chip on the integrated module board, so as to obtain the security chip module composed of the security chip and the integrated module board, in which each pin of the security chip corresponds one specific internal pad; or coating conducting resin on the pin of the security chip and/or on the internal pad on the integrated module board, aligning each pin of the security chip with the internal pad on the integrated module board, and heating and pressing the security chip to solidify the conducting resin which abuts on the security chip and bind the security chip on the integrated module board, and then obtaining the security chip module composed of the security chip and the integrated module board, in which each pin of the security chip corresponds one specific internal pad.

3. The method as claimed in claim 1, wherein, the depth of every point of the notch is the same;
assembling the security chip module on the main circuit board via engagement with each other between the solder ball on the security chip pad and the external pad on the integrated module board specifically comprises:
pointing tin cream on each external pad on the integrated module board and/or on a section of each solder ball at the bottom of the notch, welding the security chip module on the main circuit board according to a process for aligning each external pad on the integrated module board with the section of the corresponding solder ball at the bottom of the notch, in which each external pad corresponds one specific solder ball; or
coating Anisotropic Conductive Adhesive (ACA) on each external pad on the integrated module board and/or on a section of each solder ball at the bottom of the notch, aligning each external pad on the integrated module board with the section of the corresponding solder ball at the bottom of the notch to adhere the security chip module on the main circuit board, in which each external pad corresponds one specific solder ball.

4. The method as claimed in claim 1, wherein, a depth at a central part of the notch is deeper than a depth at an edge of the notch, a profile of the notch is a stair-shape, and a horizontal base area of the central part of the notch is smaller than a base area of the integrated module board in the security chip module;
assembling the security chip module on the main circuit board via engagement with each other between the solder ball on the security chip pad and the external pad on the integrated module board specifically comprises:
pointing tin cream on each external pad on the integrated module board and/or on a section of each solder ball at the bottom of the notch, welding the security chip module on the main circuit board via engagement with each other between integrated module board in the security chip module and an edge part of the notch according to a process for aligning each external pad on the integrated module board with the section of the corresponding solder ball at the bottom of the notch, in which each external pad corresponds one specific solder ball; or
coating ACA on each external pad on the integrated module board and/or on a section of each solder ball at the bottom of the notch, engaging the integrated module board in the security chip module with the edge part of the notch, and aligning each external pad on the integrated module board with a section of the corresponding solder ball at the bottom of the notch to bind the security chip module on the main circuit board, in which each external pad corresponds one specific solder ball.

5. The method as claimed in claim 1, wherein, a depth at a central part of the notch is deeper than a depth at an edge of the notch, a profile of the notch is a stair-shape, and the central part of the notch matches with the security chip in the security chip module;
assembling the security chip module on the main circuit board via engagement with each other between the solder ball on the security chip pad and the external pad on the integrated module board specifically comprises:
pointing tin cream on each external pad on the integrated module board and/or on a section of each solder ball at the bottom of the notch, engaging the security chip in the security chip module with the central part of the notch, welding the security chip module on the main circuit board according to a process for aligning each external pad on the integrated module board with the section of the corresponding solder ball at the bottom of the notch, in which each external pad corresponds one specific solder ball; or,
coating ACA on each external pad on the integrated module board and/or a section of each solder ball at the bottom of the notch, engaging the security chip in the security chip module with the central part of the notch, binding the security chip module on the main circuit board according to a process for aligning each external pad on the integrated module board with the section of the corresponding solder ball at the bottom of the notch, in which each external pad corresponds one specific solder ball.

6. A method for making a smart card, wherein said comprises the following steps:
flipping and pressing a security chip in a first preset area of a main circuit board, planting multiple solder balls in a second preset area of the main circuit board;
filling the main circuit board in a notch of a base plate, milling the notch on the base plate according to the location of the pad in the second preset area to make the solder ball on a pad in the second preset area visible at the bottom of the notch;
filling a contactor module in the notch, and assembling the contactor module on the main circuit board via the solder ball on the pad in the second preset area,
the contactor module includes multiple contactors which are insulated from each other and pins corresponding each contactor, the number of the pins in the contactor module equals the number of pads in the second preset area;
assembling the contactor module on the main circuit board via the solder ball on the pad in the second preset area specifically comprises:
coating conducting resin on the pin of the contactor module and/or the solder ball on the pad in the second preset area, aligning each pin of the contactor module with the solder ball on the corresponding pad in the second preset area, and filling the contactor module in the notch, in which each pin of the contactor module corresponds one specific pad in the second preset area;
pressing and heating the contactor module to solidify the conducting resin which abuts on the contactor module, there are provided multiple concave dots at the bottom of the notch, the number of the concave dots equals the number of the pads in the second preset area, the bottom of each concave dot includes a milled section of the solder ball on the pad in the second preset area, and a horizontal base area of each concave dot is not smaller than the area of the corresponding pin in the contactor module;
coating conducting resin on the pin of the contactor module and/or on the solder ball on the pad in the second preset area, aligning the pin of the contactor module with the solder ball on the pad in the second preset area and filling the contactor module in the notch specifically comprises:
coating conducting resin on each pin of the contactor module and/or the section of the solder ball at the bottom of the concave dot, aligning each of the contactor module with the section of the solder ball at the bottom of the corresponding concave dot to adhere the contactor module on the main circuit, in which each pin of the contactor module corresponds one specific concave dot.

7. The method as claimed in claim 6, wherein, flipping and pressing the security chip in the first preset area of the main circuit board specifically comprises:
welding the security chip in the first preset area of the main circuit board; or,
adhering the security chip in the first preset area of the main circuit board via conducting resin,
in which setting multiple pads in the first preset area of the main circuit board, a number of the pads in the first preset area equals a number of the pins of the security chip, and the pads in the first preset area are insulated from each other;
welding the security chip in the first preset area of the main circuit board specifically comprises:
planting solder balls on pins of the security chip and/or on pads in the first preset area, aligning each pin of the security chip with the corresponding pad in the first preset area via the solder ball to weld the security chip in the first preset area of the main circuit board, in which each pin of the security chip corresponds one specific pad in the first preset area;
adhering the security chip in the first preset area of the main circuit board by using conducting resin specifically comprises:
coating conducting resin on the pin of the security chip and/or on the pad in the first preset area, aligning each pin of the security chip with the corresponding pad in the first preset area via conducting resin, and pressing and heating the security chip to solidify the conducting resin which abuts on the security chip to adhere the security chip in the first preset area of the main circuit, in which each pin of the security chip corresponds one specific pad in the first preset area.

8. The method as claimed in claim 6, wherein the contactor module comprises multiple contactors which are insulated from each other and pins which correspond each contactor, the number of the pins in the contactor module equals the number of the pads in the second preset area;
assembling the contactor module on the main circuit board via the solder ball on the pad in the second preset area specifically comprises:
planting a solder ball on the pin of the contactor module, aligning each pin of the contactor module with the solder ball on the corresponding pad in the second preset area via the solder ball, filling the contactor module in the notch to weld the contactor module on the main circuit board, in which each pin of the contactor module corresponds one specific pad in the second preset area.

9. A smart card, wherein said smart card comprises a base plate and a main circuit which is filled in the base plate, there are solder ball planted on the security chip pad in the main circuit board, there is a notch in the base plate, the notch corresponds the security chip pad, the solder ball on the security chip pad is visible at the bottom of the notch; there is a security chip module filled in the notch, and the security chip module is assembled on the main circuit via the solder ball on the security chip pad; the security chip module comprises an integrated module board and a security chip which is assembled on the integrated module board, there are multiple contactors which are insulated from each other on one layer of the integrated module board,
the depth of every point of the notch is the same; each external pad on the integrated module board is adhered to the section of the corresponding solder ball at the bottom of the notch through ACA on the external pad on the integrated module board and/or ACA on the section of each solder ball at the bottom of the notch, in which each external pad corresponds one specific solder ball; or, the depth at the central of the notch is deeper than the depth at the edge of the notch, and a profile of the notch is the stair-shape, and the horizontal base area of the central part of the notch is smaller than the base area of the integrated module board in the security chip module; the integrated module board in the security chip module matches with the edge part of the notch; each external pad on the integrated module board is adhered to the section of the corresponding solder ball at the bottom of the notch through ACA on each external pad on the integrated module board and/or ACA on the section of each solder ball at the bottom of the notch, in which each external pad corresponds one specific solder ball; or, the depth at the central of the notch is deeper than the depth at the edge of the notch, a profile of the notch is the stair-shape, and the central part of the notch matches with the security chip in the security chip module; the security chip in the security chip module engages with the central part of the notch; each external pad on the integrated module board is adhered to the section of the corresponding solder ball at the bottom of the notch through ACA on each external pad on the integrated module board and/or ACA on the section of each solder ball at the bottom of the notch, in which each external pad corresponds one specific solder ball; or the depth at a central part of the notch is deeper than the depth at the edge of the notch, a profile of the notch is the stair-shape, and the central part of the notch matches with the security chip in the security chip module; there are multiple concave dots at the bottom of the notch, and the number of the concave dots equals the number of the security chip pads in the main circuit board, the bottom of each concave dot includes a milled section of the solder ball on the security chip pad, and the horizontal base area of each concave dot is not smaller than the base area of the external pad on the integrated module board; the security chip in the security chip module engages with the central part of the notch, and each external pad on the integrated module board is aligned with the section of the solder ball at the bottom of the corresponding concave dot.

10. The smart card as claimed in claim 9, wherein there are multiple internal pads laid on the integrated module board, and the security chip is assembled on the integrated module board with engagement between the pin of the security chip and the internal pad on the integrated module board; or, each pin of the security chip is welded with the corresponding internal pad on the integrated module board via the solder ball planted on the pin and/or the solder ball planted on the internal pad on the integrated module board, in which each pin of the security chip corresponds to one specific internal pad.

11. The smart card as claimed in claim 10, wherein, each pin of the security chip is adhered to the corresponding internal pad on the integrated module board via conducting resin coated on the pin of the security chip and/or via conducting resin coated on the internal pad on the integrated module board, in which each pin of the security chip corresponds one specific internal pad.

12. The smart card as claimed in claim 10, wherein there are multiple external pads laid on the integrated module board, each internal pad connects to a corresponding external pad, and each internal pad corresponds one specific external pad; the security chip module is assembled on the main circuit board with engagement between the solder ball on the security chip pad and the external pad on the integrated module board.

13. A smart card, wherein said smart card comprises a base plate and a main circuit board which is filled in the base plate, a security chip is flipped and pressed in a first preset area of the main circuit board, there are multiple solder balls planted in a second preset area of the main circuit board, there is a notch in the base plate, the notch corresponds a pad in the second preset area, and a solder ball on the pad in the second preset area is visible at the bottom of the notch; a contactor module is filled in the notch, and the contactor module is assembled on the main circuit via the solder ball on the pad in the second preset area, the contactor module comprises multiple of contactors which are insulated from each other and pins of each contactor, the number of the pins in the contactor module equals the number of pads in the second preset area;

each pin of the contactor module is adhered with the solder ball on the corresponding pad in the second preset area via conducting resin coated on each pin of the contactor module and/or conducting resin coated on the solder ball on the corresponding pad in the second preset area, in which each pin of the contactor module corresponds one specific pad in the second preset area, there are multiple of concave dots at the bottom of the notch, the number of the concave dots equals the number of pads in the second preset area, the bottom of each concave dot comprises milled section of the solder ball on the pads in the second preset area, and the horizontal base area of each concave dot is not smaller than the area of the corresponding pin in the contactor module;

each pin of the contactor module is adhered with the section of the solder ball at the bottom of the corresponding notch via conducting resin coated on each pin of the contactor module and/or conducting resin coated on the section of the solder ball at the bottom of the corresponding notch, in which each pin of the contactor module corresponds one specific concave dot.

14. The smart card as claimed in claim 13, wherein the security chip is welded in the first preset area of the main circuit; or, the security chip is adhered in the first preset area of the main circuit via conducting resin;

in which there are multiple pads set in the first preset area of the main circuit, the number of the pads in the first preset area equals a number of pins of the security chip, and the pads in the first preset area are insulated from each other;

each pin of the security chip is welded with the corresponding pad in the first preset area through the solder ball planted on each pin and/or the solder ball planted on the corresponding pad in the first preset area, in which each pin of the security chip corresponds one specific pad in the first preset area;

each pin of the security chip is adhered with the corresponding pad in the first preset area via conducting resin coated on each pin of the security chip and/or conducting resin coated on the corresponding pad in the first preset area, in which each pin of the security chip corresponds one specific pad in the first preset area.

15. The smart card as claimed in claim 13, wherein the contactor module comprises multiple contactors which are insulated from each other and pins corresponding each contactor, the number of the pins in the contactor module equals the number of pads in the second preset area; there is a solder ball planted on the pin of the contactor module, and each pin of the contactor module is welded with the solder ball on the corresponding pad in the second preset area via the solder ball, in which each pin of the contactor module corresponds one specific pad in the second preset area.

* * * * *